United States Patent
Sekizawa

(10) Patent No.: US 11,549,809 B2
(45) Date of Patent: *Jan. 10, 2023

(54) ROAD SURFACE STATE DETERMINATION DEVICE AND TIRE SYSTEM

(71) Applicant: DENSO CORPORATION, Kariya (JP)

(72) Inventor: Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 346 days.

This patent is subject to a terminal disclaimer.

(21) Appl. No.: 16/859,799

(22) Filed: Apr. 27, 2020

(65) Prior Publication Data

US 2020/0256672 A1    Aug. 13, 2020

Related U.S. Application Data

(63) Continuation of application No. PCT/JP2018/040125, filed on Oct. 29, 2018.

(30) Foreign Application Priority Data

Oct. 30, 2017 (JP) ............................. JP2017-209402
Jun. 14, 2018 (JP) ............................. JP2018-113705

(51) Int. Cl.
*G01B 17/08* (2006.01)
*G07C 5/00* (2006.01)
(Continued)

(52) U.S. Cl.
CPC .............. *G01B 17/08* (2013.01); *B60C 19/00* (2013.01); *G06N 20/00* (2019.01); *G07C 5/008* (2013.01); *B60C 2019/004* (2013.01)

(58) Field of Classification Search
CPC ...................................................... G01B 17/08
See application file for complete search history.

(56) References Cited

U.S. PATENT DOCUMENTS 10,034,066 B2 *   7/2018  Tran ................... G09B 19/0038
10,525,777 B2 *   1/2020  Goto ...................... B60C 23/064
(Continued)

FOREIGN PATENT DOCUMENTS

JP         2016107833 A      6/2016
JP         2018184101 A     11/2018
(Continued)

OTHER PUBLICATIONS

U.S. Appl. No. 16/904,260, filed Jun. 17, 2020, Yoichiro Suzuki et al.
(Continued)

*Primary Examiner* — Michael A Berns
(74) *Attorney, Agent, or Firm* — Harness, Dickey & Pierce, P.L.C.

(57) ABSTRACT

A road surface state determination device includes a tire-side device and a vehicle-body-side system. The tire-side device is attached to a tire of a vehicle. The vehicle-body-side system is included in a vehicle body. The tire-side device outputs a detection signal corresponding to a magnitude of vibration of the tire. The tire-side device generates road surface data indicative of a road surface state shown in a waveform of the detection signal. The tire-side device transmits the road surface data. The vehicle-body-side system receives the road surface data transmitted from the tire-side device. The vehicle-body-side system determines the road surface state of a road surface on which the vehicle is traveling based on the road surface data and learning data.

11 Claims, 17 Drawing Sheets

(51) Int. Cl.
    *G06N 20/00*          (2019.01)
    *B60C 19/00*          (2006.01)

(56) References Cited

U.S. PATENT DOCUMENTS

| | | | |
|---|---|---|---|
| 11,090,985 B2 * | 8/2021 | Achterholt | B60C 11/243 |
| 11,198,336 B2 * | 12/2021 | Sekizawa | B60C 23/0455 |
| 2018/0264894 A1 | 9/2018 | Goto et al. | |
| 2020/0049497 A1 * | 2/2020 | Suzuki | G01B 17/08 |
| 2020/0256672 A1 * | 8/2020 | Sekizawa | G06N 20/10 |
| 2020/0346655 A1 * | 11/2020 | Suzuki | B60T 8/1725 |

FOREIGN PATENT DOCUMENTS

| | | |
|---|---|---|
| WO | WO-2018199262 A1 | 11/2018 |
| WO | WO-2019087968 A1 | 5/2019 |

OTHER PUBLICATIONS

U.S. Appl. No. 16/859,524, filed Apr. 27, 2020, Sekizawa.
U.S. Appl. No. 16/904,260, filed Jun. 17, 2020, Suzuki et al.

* cited by examiner

ROAD SURFACE STATE DETERMINATION DEVICE AND TIRE SYSTEM

CROSS REFERENCE TO RELATED APPLICATIONS

The present application is a continuation application of International Patent Application No. PCT/JP2018/040125 filed on Oct. 29, 2018, which designated the U.S. and claims the benefit of priority from Japanese Patent Application No. 2017-209402 filed on Oct. 30, 2017, and Japanese Patent Application No. 2018-113705 filed on Jun. 14, 2018. The entire disclosures of all of the above applications are incorporated herein by reference.

TECHNICAL FIELD

The present disclosure relates to a road surface state determination device including a tire-side device which detects vibration received by a tire and generates road surface data indicative of a road surface state based on vibration data, and a vehicle-body-side system which receives the road surface data and estimates the road surface state. The present disclosure also relates to a tire system including the road surface state determination device.

BACKGROUND

Road surface state determination methods have been proposed. In one of the road surface state determination methods, vibration applied to a tire is detected using an acceleration sensor provided in a back surface of a tire tread, and a road surface state is estimated based on a result of the detection of the vibration. The road surface state determination method extracts a feature vector from a waveform of the vibration applied to the tire and calculates a degree of similarity of the extracted feature vector to each support vector stored for each type of a road surface to determine the road surface state.

SUMMARY

The present disclosure provides road surface state determination device includes a tire-side device and a vehicle-body-side system. The tire-side device is attached to a tire of a vehicle. The vehicle-body-side system is included in a vehicle body. The tire-side device outputs a detection signal corresponding to a magnitude of vibration of the tire. The tire-side device generates road surface data indicative of a road surface state shown in a waveform of the detection signal. The tire-side device transmits the road surface data. The vehicle-body-side system receives the road surface data transmitted from the tire-side device. The vehicle-body-side system determines the road surface state of a road surface on which the vehicle is traveling based on the road surface data and learning data.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
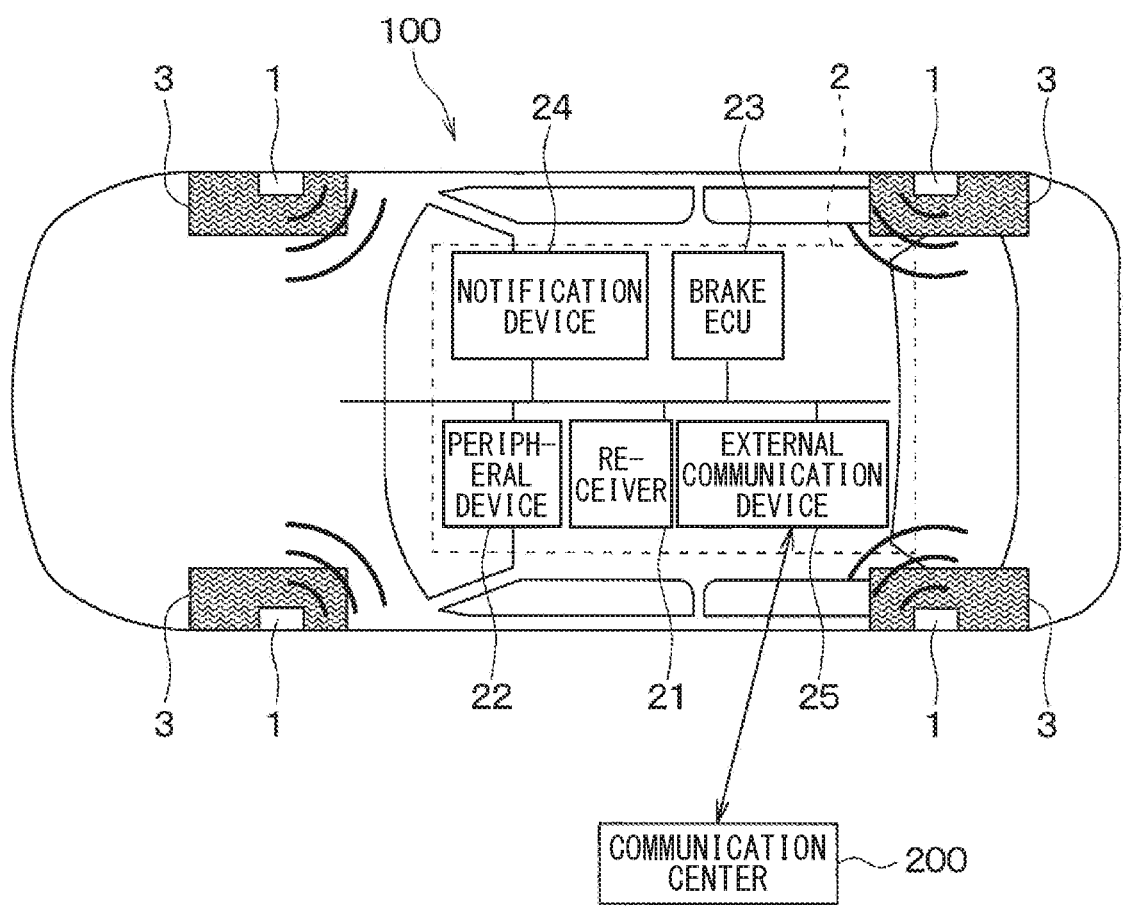
FIG. 1 is a diagram illustrating a block configuration of a tire device to which a road surface state determination device according to a first embodiment is applied in a state where the tire device is mounted in a vehicle.

For example, in a road surface state determination method, an algorithm for determining a road surface state is an off-line type, that is, a pre-learning type. Learning is performed using a support vector machine in order to acquire a support vector, and stored data is used to determine a road surface state. However, in a situation where a vehicle travels on a totally unknown road surface, it may be impossible to appropriately determine the road surface state using the stored data of the pre-learned support vector.

The present disclosure provides a road surface state determination device capable of appropriately determining a road surface state even in a situation which cannot be handled using pre-learned data that has been stored. The present disclosure also provides a tire system including the road surface state determination device.

An example embodiment of the present disclosure provides a road surface state determination device that includes a tire-side device and a vehicle-body-side system. The tire-side device is attached to a tire of a vehicle. The vehicle-body-side system is included in a vehicle body. The tire-side device includes a vibration detection unit, a waveform processing unit, and a first data communication unit. The vibration detection unit is configured to output a detection signal corresponding to a magnitude of vibration of the tire. The waveform processing unit is configured to generate road surface data indicative of a road surface state shown in a waveform of the detection signal. The first data communication unit is configured to transmit the road surface data. The vehicle-body-side system includes a second data communication unit, a storage unit, a road surface determination unit, a peripheral device, and an environment determination unit. The second data communication unit is configured to receive the road surface data transmitted from the first data communication unit. The storage unit is configured to store learning data. The road surface determination unit is configured to determine the road surface state of a road surface on which the vehicle is traveling based on the road surface data and the learning data. The peripheral device is configured to acquire environment data related to the road surface state. The environment determination unit is configured to determine, based on the environment data, whether the vehicle is in a learning situation, which is a situation in which a learning operation for the learning data is to be performed, and cause the second data communication unit to transmit a request signal to the tire-side device when determining that the vehicle is in the learning situation. When the first data communication unit receives the request signal, the waveform processing unit generates the road surface data and causes the first data communication unit to transmit the road surface data to the vehicle-body-side system. When the learning operation, by machine learning, is performed to generate update data for updating the learning data using the road surface data transmitted from the tire-side device and a type of the learning situation, which is indicated by the environment data, the vehicle-body-side system causes the storage unit to store new learning data by adding the update data to the learning data stored in the storage unit.

In the example embodiment of the present disclosure, the road surface state determination device, the peripheral device provided in the vehicle acquires the environment data. Whether the situation in which the learning data is to be learned occurs determined based on the environment data. When it is determined that the situation in which the learning data is to be learned occurs, the learning operation is performed for the learning data using the road surface data associated with the situation type. As a result, it is possible to not only use the learning data stored as initial data in the storage unit, but also update the learning data depending on the situation.

Accordingly, it is possible to provide the road surface state determination device capable of appropriately determining the road surface state even in a situation which cannot be handled using the stored data that is pre-learned.

First Embodiment

Referring to FIGS. 1 to 12, a description will be given of a tire device 100 having a road surface state determination function according to a first embodiment. The tire device 100 according to the first embodiment determines a road surface state during driving based on vibration applied to a ground contact surface of a tire provided in each of wheels of a vehicle, and also performs warning of danger to the vehicle, vehicle movement control, and the like based on the road surface state.

Figure 2:
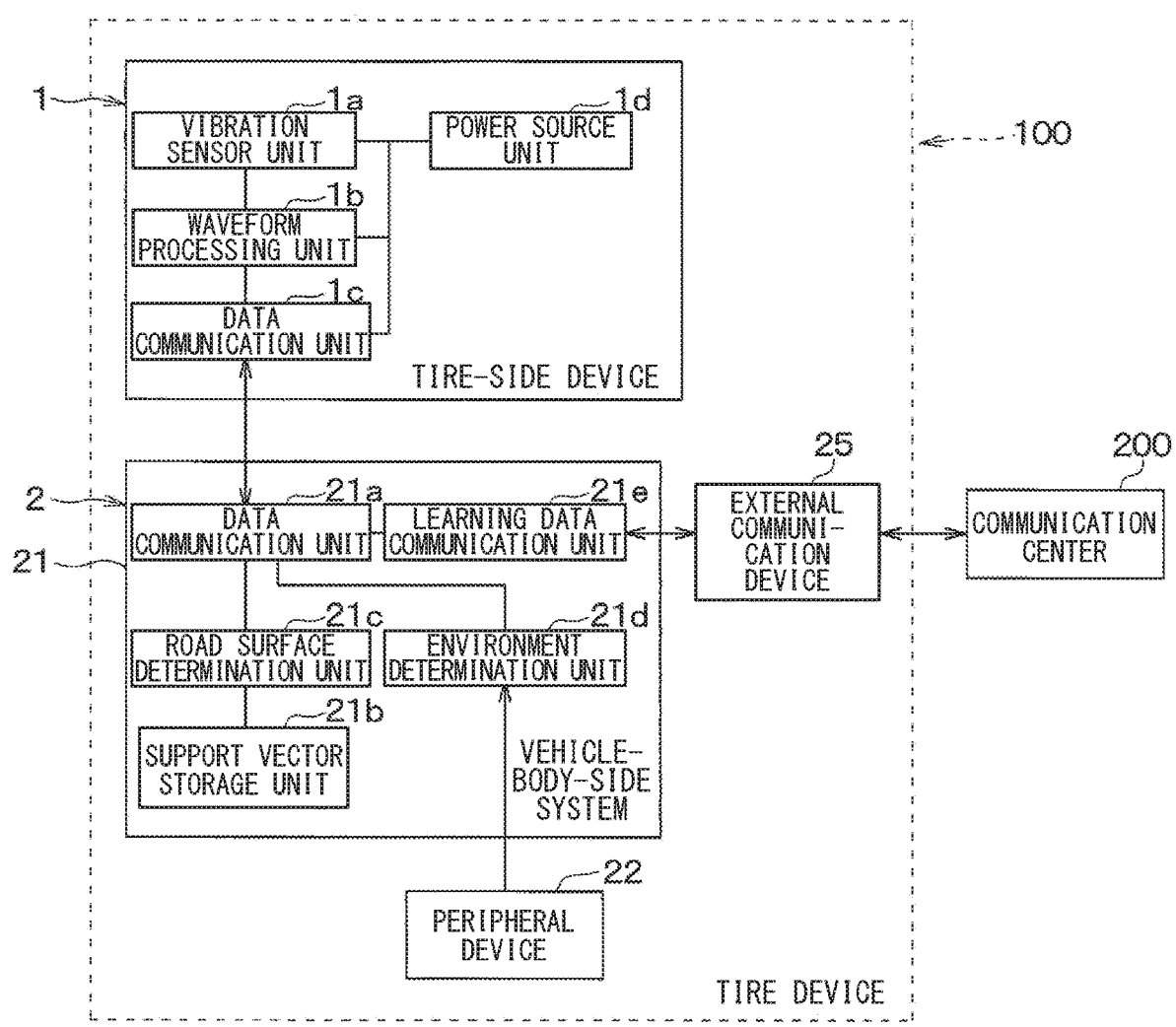
FIG. 2 is a block diagram illustrating details of a tire-side device and a vehicle-body-side system.

As illustrated in FIGS. 1 and 2, the tire device 100 is configured to include a tire-side device 1 provided in a wheel and a vehicle-body-side system 2 provided in a vehicle body. The vehicle-body-side system 2 includes a receiver 21, a peripheral device 22, an electronic control device for brake control (hereinafter referred to as a brake ECU) 23, a notification device 24, and the like. Note that a unit of the tire device 100 which implements the road surface state determination function corresponds to a road surface state determination device. In the first embodiment, the receiver 21 and the peripheral device 22 of the tire-side device 1 and the vehicle-body-side system 2 are included in the road surface state determination device.

The tire device 100 of the first embodiment causes the tire-side device 1 to transmit data (hereinafter referred to as road surface data) corresponding to a road surface state of a road surface traveled by tires 3, and also causes the receiver 21 to receive the road surface data and determine the road surface state. The tire device 100 also transmits a result of the determination of the road surface state by the receiver 21 to the notification device 24, and causes the notification device 24 to report the result of the determination of the road surface state. As a result, the configuration is capable of reporting a road surface state such as, e.g., a dry road, a wet road, or a frozen road to a driver and also warning the driver when the road has a slippery road surface. The tire device 100 also reports the road surface state to the brake ECU 23 which controls vehicle movement or the like to cause the brake ECU 23 or the like to perform vehicle movement control for avoiding danger. For example, when the road is frozen, the brake ECU 23 or the like is caused to reduce a braking force generated based on an amount of brake operation compared to a braking force when the road is dry. Thus, the brake ECU 23 performs vehicle movement control corresponding to a case when a road surface p is low. Specifically, the tire-side device 1 and the receiver 21 are configured as follows.

Figure 3:
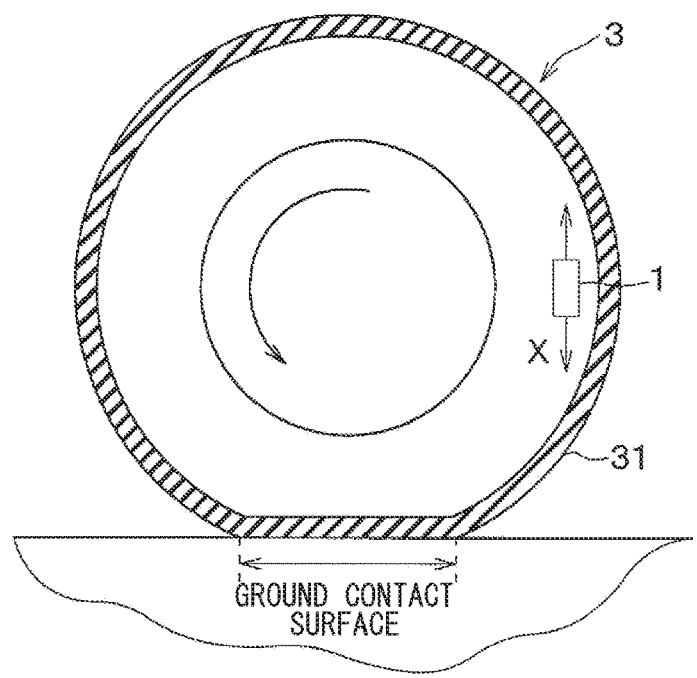
FIG. 3 is a sectional schematic diagram illustrating a tire to which the tire-side device is attached.

The tire-side device 1 is disposed in each of the tires 3 to be bidirectionally communicative with the vehicle-bodyside system 2. Specifically, as illustrated in FIG. 2, the tire-side device 1 is configured to include a vibration sensor unit 1a, a waveform processing unit 1b, a data communication unit 1c, and a power source unit 1d. As illustrated in FIG. 3, the tire-side device 1 is provided on a back surface of a tread 31 of each of the tires 3.

The vibration sensor unit 1a provides a vibration detection unit for detecting the vibration applied to the tire 3. For example, the vibration sensor unit 1a is provided by an acceleration sensor. When the vibration sensor unit 1a is provided by the acceleration sensor, the vibration sensor unit 1a outputs an acceleration detection signal as a detection signal corresponding to a magnitude of the vibration in, e.g., a direction in contact with a circular path followed by the tire-side device 1 when the tire 3 rotates, that is, a tire tangential direction shown by an arrow X in FIG. 3. More specifically, the vibration sensor unit 1a generates, as the detection signal, an output voltage having one of two directions shown by the arrow X as a positive direction. The opposite direction is represented as a negative direction. For example, the vibration sensor unit 1a detects an acceleration at predetermined sampling periods which are set to be shorter than a period of one rotation of the tire 3, and outputs the detected acceleration as the detection signal.

Note that the description has been given herein of the case where the vibration sensor unit 1a detects the vibration in the tire tangential direction, but the same applies also to detection of vibration in another direction, i.e., a tire radial direction.

The waveform processing unit 1b is provided by a known microcomputer including a CPU, a ROM, a RAM, an I/O, and the like, performs signal processing of the detection signal based on a program stored in the ROM or the like, and generates road surface data representing a road surface state appearing in the detection signal. As the road surface data, there is data including a feature quantity of tire vibration and data including a raw waveform of the detection signal in addition to the feature quantity.

Specifically, the waveform processing unit 1b uses the detection signal output from the vibration sensor unit 1a as the detection signal representing vibration data in the tire tangential direction to perform waveform processing of a vibration waveform represented by the detection signal and thus extract the feature quantity of the tire vibration. In the first embodiment, by performing the signal processing of the detection signal for the acceleration (hereinafter referred to as the tire G) of the tire 3, the waveform processing unit 1b extracts the feature quantity of the tire G. The waveform processing unit 1b also acquires the raw waveform which serves as the detection signal from the vibration sensor unit 1a, performs signal processing such as noise removal as required, and digitizes a result of the signal processing (the digitized raw waveform is hereinafter referred to as raw waveform data item). Then, the waveform processing unit 1b transmits, as the road surface data, data including the extracted feature quantity or data including the raw waveform data item in addition to the feature quantity to the data communication unit 1c. Note that details of the feature quantity mentioned herein will be described later.

The waveform processing unit 1b controls data transmission from the data communication unit 1c. The waveform processing unit 1b causes the data communication unit 1c to transmit the data by transmitting the road surface data to the data communication unit 1c with a time point with which data transmission is intended to be performed. For example, the waveform processing unit 1b extracts the feature quantity of the tire G every time the tire 3 rotates once and transmits the road surface data to the data communication unit 1c at a rate of once or a plurality of times every time the tire 3 rotates once or a plurality of times. For example, the waveform processing unit 1b transmits, to the data communication unit 1c, the road surface data including the feature quantity of the tire G extracted during one rotation of the tire 3. When receiving a request signal from the vehicle-body-side system 2, the waveform processing unit 1b transmits, to the data communication unit 1c, the road surface data including the raw waveform data item in addition to the feature quantity of the tire G extracted during one rotation of the tire 3.

The data communication unit 1c is a portion forming a first transceiver and performs data communication with a data communication unit 21a described later of the receiver 21 in the vehicle-body-side system 2. The data communication unit 1c is configured to be capable of performing bidirectional communication with the data communication unit 21a. The data communication unit 1c described herein has a single configuration, but may also be configured as a transmission unit and a reception unit which are separated from each other. As a mode of the bidirectional communication, various modes can be used appropriately, and Bluetooth communication including BLE (abbreviation of Bluetooth Low Energy) communication, a wireless LAN (abbreviation of Local Area Network) such as wifi, Sub-GHz communication, ultra-wide band communication, ZigBee, or the like can be used appropriately. Note that "Bluetooth" is a registered trademark.

For example, in response to the road surface data transmitted from the waveform processing unit 1b, at the time point, the data communication unit 1c transmits the road surface data. The time point of the data transmission from the data communication unit 1c is controlled by the waveform processing unit 1b. Then, every time the road surface data is transmitted from the waveform processing unit 1b each time the tire 3 rotates once or a plurality of times or when the waveform processing unit 1b receives the request signal from the vehicle-body-side system 2, data transmission from the data communication unit 1c is performed.

The power source unit 1d serves as a power source of the tire-side device 1 and supplies power to each of the units included in the tire-side device 1 to operate each of the units. The power source unit 1d is provided by a battery such as, a button battery.

The receiver 21, the peripheral device 22, the brake ECU 23, the notification device 24, and an external communication device 25 which are included in the vehicle-body-side system 2 are driven when an activation switch such as an ignition switch not shown is turned ON.

As illustrated in FIG. 2, the receiver 21 is configured to have the data communication unit 21a, a support vector storage unit 21b, a road surface determination unit 21c, an environment determination unit 21d, and a learning data communication unit 21e. As illustrated in FIGS. 1 and 2, the receiver 21 is capable of performing data communication with the external communication device 25 and performing transmission and reception with a communication center 200 through the external communication device 25.

The data communication unit 21a is a portion forming a second transceiver and receives the road surface data including the feature quantity or the road surface data including the raw waveform data item in addition to the feature quantity which has been transmitted from the data communication unit 1c of the tire-side device 1 and transmits the received road surface data to the road surface determination unit 21c.

The support vector storage unit 21b stores and accumulates a support vector and, for example, accumulates the support vector for each type of the road surface. The support vector refer to a feature quantity serving as a model, which is obtained by, e.g., leaning using a support vector machine. The vehicle including the tire-side device 1 is experimentally caused to run on each type of the road surface. The feature quantities extracted at that time by the feature quantity extraction unit 11a are learned for a predetermined number of tire rotations and typical feature quantities corresponding to the predetermined number of rotations are extracted from the extracted feature quantity to be used as the support vector. For example, the feature quantities corresponding to 1,000,000 rotations are learned for each type of the road surface and, from the learned feature quantities, typical feature quantities corresponding to 100 rotations are extracted to be used as the support vector.

The support vector storage unit 21b preliminarily stores default support vector at the time of vehicle delivery. However, when an updated support vector is transmitted from the learning data communication unit 21e, the support vector storage unit 21b also stores the updated support vector. Accordingly, the support vector storage unit 21b updates the support vector. The support vector storage unit 21b adds the updated support vector to the preliminarily stored support vector herein to allow the resulting support vector to be used as a new updated support vector. Note that the updating of the support vector is not limited to a method which adds the updated support vector to the preliminarily stored support vector. It may also be possible to use a method which overwrites or replaces at least any of the preliminarily stored support vectors with the updated support vector.

The road surface determination unit 21c is provided by a known microcomputer including a CPU, a ROM, a RAM, an I/O, and the like and performs various processes based on programs stored in the ROM or the like to determine the road surface state. Specifically, the road surface determination unit 21c compares the feature quantity included in the road surface data transmitted from the waveform processing unit 1b to the support vector stored in the support vector storage unit 21b to determine the road surface state.

For example, the road surface determination unit 21c compares the feature quantity included in the road surface data received most recently to the support vector stored for each type of the road surface, and determines the road surface corresponding to the support vector closest to the most recent feature quantity to be a currently traveled road surface.

When determining the road surface state, the road surface determination unit 21c transmits the determined road surface state to the notification device 24 and causes the notification device 24 to notify the driver of the road surface state as required. As a result, the driver tries to drive in consideration of the road surface state and can avoid danger to the vehicle. For example, the road surface determination unit 21c may constantly display the determined road surface state through the notification device 24 or may also display the road surface state to warn the driver when the determined road surface state is that of a wet road, a frozen road, or the like, and the driver is required to drive carefully. In addition, the receiver 21 reports the road surface state to the ECU for performing the vehicle movement control, such as the brake ECU 23, to allow the vehicle movement control to be performed based on the reported road surface state.

The environment determination unit 21d determines a situation in which the support vector is to be learned based on the environment data obtained from the peripheral device 22 and outputs, based on a result of the determination, the request signal requesting the road surface data to the tire-side device 1. For example, the environment determination unit 21d determines whether or not there is the situation in which the support vector is to be learned. Then, when determining that there is the situation in which the support vector is to be learned, the environment determination unit 21d outputs the request signal to the tire-side device 1 through the data communication unit 21a.

The "situation in which the support vector is to be learned" mentioned herein indicates that a condition different from the learning condition under which the support vector has been extracted occurs, for example, in a case where the road surface state of the road surface traveled by the vehicle has changed based on the environment data. Since the support vector is the typical feature quantity extracted from a result of learning performed under a specified condition, if a real running condition is different from the running condition under which the learning was performed, it is preferred to also perform learning under the real condition. For example, when a type of the road surface is different from that in the condition under which the stored support vector was learned, support vector is determined to be learned for a new type of the road surface. Even when the type of the road surface is similar to that in the condition under which the stored support vector was learned, appropriate support vector may vary depending on a real environment in which the vehicle is running, a manner in which the vehicle is running, a tire type, a varying tire pressure or tire wear amount, a season, a temperature, or weather. In such cases, even when the road surface state is similar to that under the learning condition, the detection signal from the vibration sensor unit 1a varies from an expected detection signal. As a result, the learned support vector may be in an inappropriate state. Such a case is referred to as the "situation in which the support vector is to be learned". The "situation in which the support vector is to be learned" is also referred to as a learning situation.

The learning data communication unit 21e acquires the road surface data including the raw waveform data item in addition to the feature quantity received by the data communication unit 21a. The learning data communication unit 21e associates the data, to the received road surface data, data on a type of the situation determined by the environment determination unit 21d to be the situation in which the support vector is to be learned. The learning data communication unit 21e further assigns, to the road surface data, vehicle data such as ID information of the subject vehicle, and transmits the data set to the external communication device 25. As a result, to the communication center 200 provided outside the vehicle, the vehicle data for distinguishing the subject vehicle from another vehicle is transmitted through the external communication device 25 in addition the feature quantity, the road surface data including the raw waveform data item, and the data on the situation type.

When acquiring the updated support vector transmitted from the communication center 200 through the external communication device 25, the learning data communication unit 21e transmits the acquired updated support vector to the support vector storage unit 21b. As a result, the support vector storage unit 21b further adds the support vector obtained as a learning result to the stored support vector, and determines the resulting support vector as new updated support vector.

The peripheral device 22 includes various devices provided in the vehicle, and acquires environment data related to the road surface state to be used for recognition of the situation in which the support vector is to be learned, such as a change in the road surface state, as described above and transmits the environment data to the environment determination unit 21*d*. For example, an in-vehicle camera, the brake ECU 23, a wiper device, a load sensor, a tire pressure monitoring system (hereinafter referred to as TPMS), or the like is used appropriately as the peripheral device 22.

Specifically, using the in-vehicle camera, a road surface ahead of the vehicle and image data around the vehicle can be acquired as the environment data. As a result, the environment determination unit 21*d* can analyze the image data from the in-vehicle camera and determine the road surface state, a real vehicle running environment, a way of vehicle running, weather, and the like based on a result of the analysis. In addition, the brake ECU 23 performs various control such as ABS (abbreviation of Antilock Brake System) and VSC (abbreviation of Vehicle stability control), and may estimate a road surface friction coefficient or a road surface state. In such a case, the environment determination unit 21*d* can acquire information related to the road surface state from the brake ECU 23 and determine the road surface state based on the information. The wiper device is driven when, e.g., it rains or snows. As a result, the environment determination unit 21*d* can acquire information that the wiper is driven from a control unit of the wiper device and determine that the road surface state is, e.g., a wet state and the weather based on the information.

Based on a result of the determination of the road surface state, such as the weather, or the like, it is possible to specify a case where, even when the type of the road surface is similar to that in the condition under the stored support vector was learned, the running environment, the way of running, the weather, or the like is different or where the type of the road surface is different from that in the learning condition. Therefore, it is possible to learn the support vector to which various parameters such as the type of the road surface, the running environment, the way of running, and the weather is capable of being added.

Note that, for the estimation of the road surface state based on the analysis of the image data using the in-vehicle camera and the estimation of the road surface state by the brake ECU 23, a known method may be used appropriately.

In addition, it is possible to acquire a load applied to the tire 3 using the load sensor and acquire the tire pressure using the TPMS. Even when the road surface state is similar to that in the situation in which the support vector was learned, a state quantity may vary depending on tire information including a magnitude of the load applied to the tire 3, the tire pressure, and the like. In such cases, even when the type of the road surface is similar to that in the condition under which the stored support vector was learned, the support vector may be inappropriate. Accordingly, by obtaining the tire information as the environment data from the load sensor and the TPMS, it is possible to learn the feature quantity to which the tire information is also added in addition to the type of the road surface.

Note that, as the peripheral device 22, a peripheral device other than the examples mentioned above may also be used as long as the peripheral device 22 can acquire the environment data which can be used to recognize the situation in which the support vector is to be learned. For example, it may also be possible that a navigation system not shown or the like acquires a weather information item, a temperature information item, a season information item, a region information item, a frozen road surface information item, or the like and transmits the acquired information as the environment data to the environment determination unit 21*d*. In addition, the type of the tire 3, such as a worn state, or the like may also be used as the tire information serving as the environment data. The changing of the type of the tire 3 may be stored appropriately in the receiver 21 through an operation switch not shown or the like. The worn state may be estimated appropriately from a running distance or the like obtained from a meter ECU not shown or the like.

The brake ECU 23 is provided by a braking control device which performs various brake control. Specifically, the brake ECU 23 drives an actuator for controlling a brake fluid pressure to increase or reduce a wheel cylinder pressure and control the braking force. The brake ECU 23 can also independently control a braking force applied to each of the wheels. When the road surface state is transmitted from the receiver 21, the brake ECU 23 performs control of the braking force as vehicle movement control based on the road surface state. For example, when the transmitted road surface state indicates a frozen road, the brake ECU 23 reduces the braking force generated based on an amount of brake operation performed by the driver compared to that generated when the transmitted road surface state is a dry road surface. This configuration can reduce wheel slip and allow the driver to avoid danger to the vehicle.

Also, as described above, when performing various control such as the ABS or the VSC, the brake ECU 23 may estimate the road surface friction coefficient or the road surface state. In that case, information related to the road surface state is transmitted from the brake ECU 23 to the environment determination unit 21*d*.

The notification device 24 may be provided by a meter indicator or the like and used when the road surface state is reported to the driver. When the notification device 24 is provided by the meter indicator, the meter indicator is disposed at a place where the meter indicator is visually recognizable by the driver while driving the vehicle and disposed in, e.g., an instrument panel in the vehicle. When the road surface state is transmitted to the meter indicator from the receiver 21, the meter indicator displays the road surface state such that the driver can recognize the road surface state. Thus, the notification device 24 allows the road surface state to be visually reported to the driver.

Note that the notification device 24 may also be provided by a buzzer, a voice guidance device, or the like. In that case, the notification device 24 can aurally report the road surface state to the driver using a buzzer sound or voice guidance. As the notification device 24 that performs visual reporting, the meter indicator has been described by way of example, but the notification device 24 may also be provided by a display element which displays information, such as a head-up display.

The external communication device 25 is a device for performing data communication with the communication center 200 via a wireless network such as a DCM (Date Communication Module). In the first embodiment, when the road surface data including the raw waveform data item in addition to the feature quantity and data on the situation type are transmitted thereto from the receiver 21, the external communication device 25 transmits the data sets to the communication center 200 described later. The external communication device 25 receives the update data for the support vector transmitted thereto from the communication center 200 and transmits the update data to the receiver 21.

Thus, the tire device 100 according to the first embodiment is configured. Note that the individual units included in the vehicle-body-side system 2 are connected to each other through an in-vehicle LAN (abbreviation of Local Area Network) based on, e.g., CAN (abbreviation of Controller Area Network) or the like. This configuration allows the individual units to transmit information to each other via the in-vehicle LAN.

Further, in the first embodiment, in addition to the tire device 100, the communication center 200 provided outside the vehicle is used to further enhance and improve the learning data and configure the tire system which allows the support vector to be updated.

The communication center 200 functions as the support vector machine which generates the support vector through learning and as a learning device which provides the update data for the generated support vector.

Specifically, the communication center 200 uses a computer provided outside the vehicle to perform bidirectional communication with the vehicle-body-side system 2. In this configuration, the communication center 200 performs a learning operation of learning the support vector and transmits a result of the learning operation to the vehicle. In other words, the communication center 200 corresponds to a service provider computer in cloud computing (hereinafter referred to as a cloud). The support vector learned through the learning operation using the communication center 200 as the service provider computer is provided to the vehicle-body-side system 2 by the bidirectional communication. The communication center 200 also stores the support vector serving as pre-update initial data stored in the support vector storage unit 21b of each of the vehicles.

To the communication center 200, the road surface data associated to a type of the situation determined to be the situation in which the support vector is to be learned is transmitted from the receiver 21 through the external communication device 25. As a result, the communication center 200 reads the feature quantity and the raw waveform data item from the road surface data for each type of the situation and analyzes and calculates the feature quantity and the raw waveform data item. In this configuration, the communication center 200 performs the learning operation of learning the support vectors for each type of the situation. When the support vector is acquired as a result of the learning operation, the communication center 200 stores the acquired support vector in addition to the support vector stored as the initial data, while performing data transmission to each of the vehicles to transmit the acquired support vector to the receiver 21 through the external communication device 25. The support vector storage unit 21b is configured to update the support vector based on the transmitted support vector.

Thus, the tire system including the tire device 100 and the communication center 200 according to the first embodiment is configured.

Next, a description will be given of details of the feature quantity extracted by the waveform processing unit 1b described above.

The feature quantity mentioned herein is a quantity indicative of a feature of vibration applied to the tire 3 and acquired by the vibration sensor unit 1a, which is represented by, e.g., a feature vector.

Figure 4:
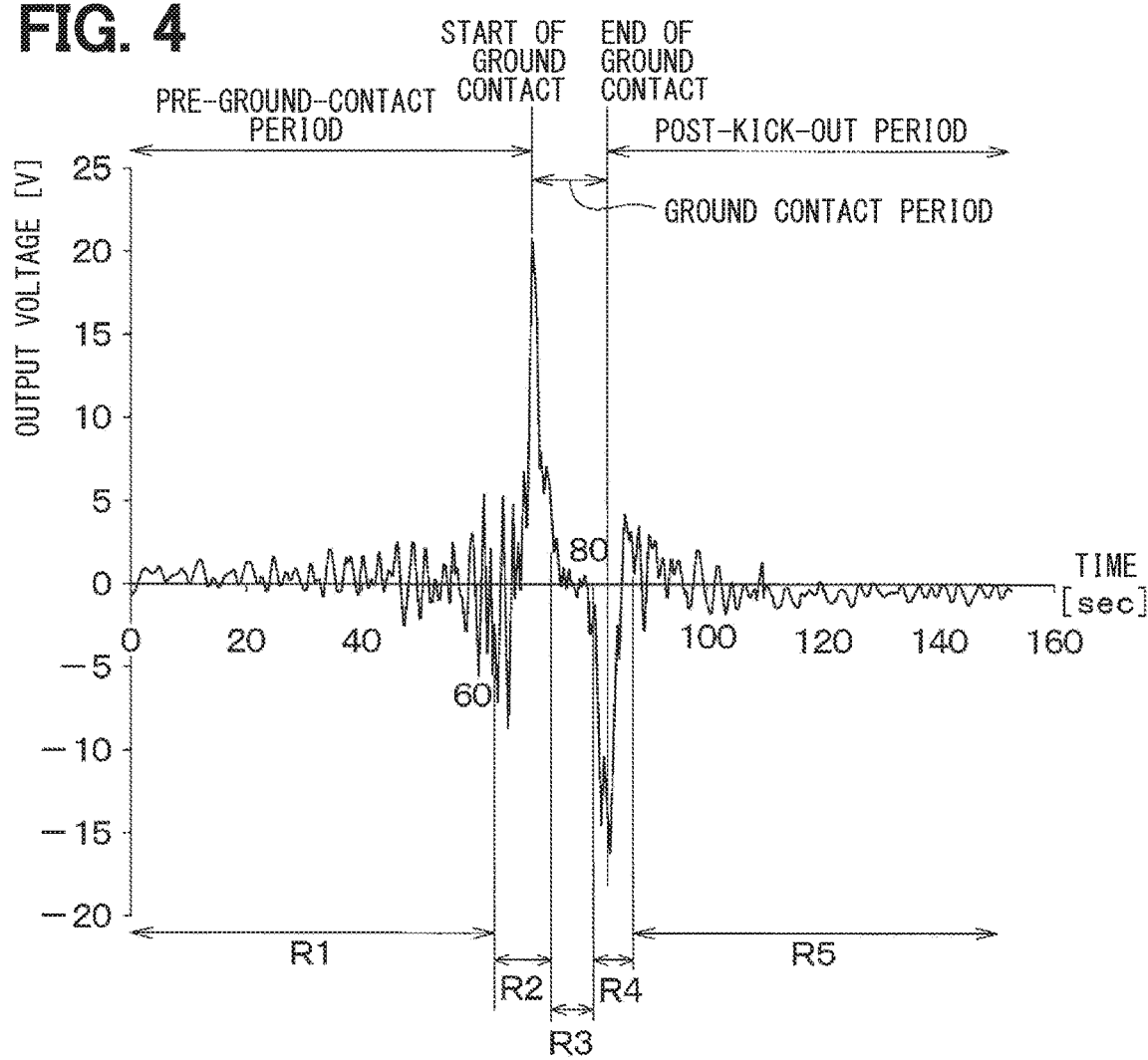
FIG. 4 is a diagram illustrating a voltage waveform output from an acceleration acquisition unit during a tire rotation.

The output voltage waveform of the detection signal from the vibration sensor unit 1a during tire rotation is, e.g., the waveform illustrated in FIG. 4. As illustrated in FIG. 4, at a ground contact start time when a portion of the tread 31 corresponding to a place where the vibration sensor unit 1a is disposed starts to come into contact with the ground with the rotation of the tire 3, the output voltage from the vibration sensor unit 1a has a maximum value. A peak value at the ground contact start time when the output voltage from the vibration sensor unit 1a has the maximum value is hereinafter referred to as a first peak value. As also illustrated in FIG. 4, at a ground contact end time when the portion of the tread 31 corresponding to the place where the vibration sensor unit 1a is disposed, which has been in contact with the ground, comes out of contact with the ground with the rotation of the tire 3, the output voltage from the vibration sensor unit 1a has a minimum value. A peak value at the ground contact end time when the output voltage from the vibration sensor unit 1a has the minimum value is hereinafter referred to as a second peak value.

The following is the reason why the output voltage from the vibration sensor unit 1a has the peak values with the time points described above. That is, when the portion of the tread 31 corresponding to the place where the vibration sensor unit 1a is disposed comes into contact with the ground with the rotation of the tire 3, a portion of the tire 3 which has been a generally cylindrical surface in the vicinity of the vibration sensor unit 1a receives pressure to be deformed into a planar shape. At this time, the vibration sensor unit 1a receives an impact, and consequently the output voltage from the vibration sensor unit 1a has the first peak value. On the other hand, when the portion of the tread 31 corresponding to the place at which the vibration sensor unit 1a is disposed comes out of contact with the ground contact surface with the rotation of the tire 3, the tire 3 is released from the pressure in the vicinity of the vibration sensor unit 1a and returned from the planar shape to a generally cylindrical shape. The vibration sensor unit 1a receives an impact when the tire 3 is returned to the original shape, and consequently the output voltage from the vibration sensor unit 1a has the second peak value. Thus, the output voltage from the vibration sensor unit 1a has the first and second peak values at the ground contact start time and the ground contact end time. In addition, since the direction of the impact when the tire 3 receives the pressure is opposite to the direction of the impact when the tire 3 is released from the pressure, reference numerals of the output voltages are also opposite to each other.

A moment when the portion of the tire tread 31 corresponding to the place where the vibration sensor unit 1a is disposed comes into contact with the ground at the road surface is assumed to fall within a "step-on region", while a moment when the portion of the tire tread 31 corresponding to the place where the vibration sensor unit 1a is disposed leaves the road surface is assumed to fall within a "kick-out region". The "step-on region" includes the time point with which the first peak value is reached, while the "kick-out region" includes the time point with which the second peak value is reached. It is also assumed that a region before the "step-on region" is a "pre-step-on region", a region between the step-on region and the kick-out region, i.e., a region where the portion of the tire tread 31 corresponding to the place where the vibration sensor unit 1a is disposed is in contact with the ground is a "pre-kick-out region", and a region after the kick-out region is a "post-kick-out region". Thus, a period during which the portion of the tire tread 31 corresponding to the place where the vibration sensor unit 1a is disposed is in contact with the ground and periods before and after the period can be segmented into the five regions. Note that, in FIG. 4, the "pre-step-on region", the "step-on region", the "pre-kick-out region", the "kick-out region", and the "post-kick-out region" of the detection signal are successively shown as five regions R1 to R5.

Depending on the road surface state, vibration occurred in the tire 3 varies from one of the regions resulting from the segmentation to another, and the detection signal from the vibration sensor unit 1a varies from one of the regions to another. Accordingly, by subjecting the detection signal from the vibration sensor unit 1a in each of the regions to frequency analysis, the road surface state of the road surface traveled by the vehicle is detected. For example, in a slippery road surface state such as that of a hard-compacted snow road, a sheering force at a kick-out time deteriorates, and consequently a band value selected in a 1 kHz to 4 kHz band decreases in the kick-out region R4 and the post-kick-out region R5. Thus, each of frequency components of the detection signal from the vibration sensor unit 1a varies depending on the road surface state, and therefore it is possible to determine the road surface state based on the frequency analysis of the detection signal.

Figure 5:
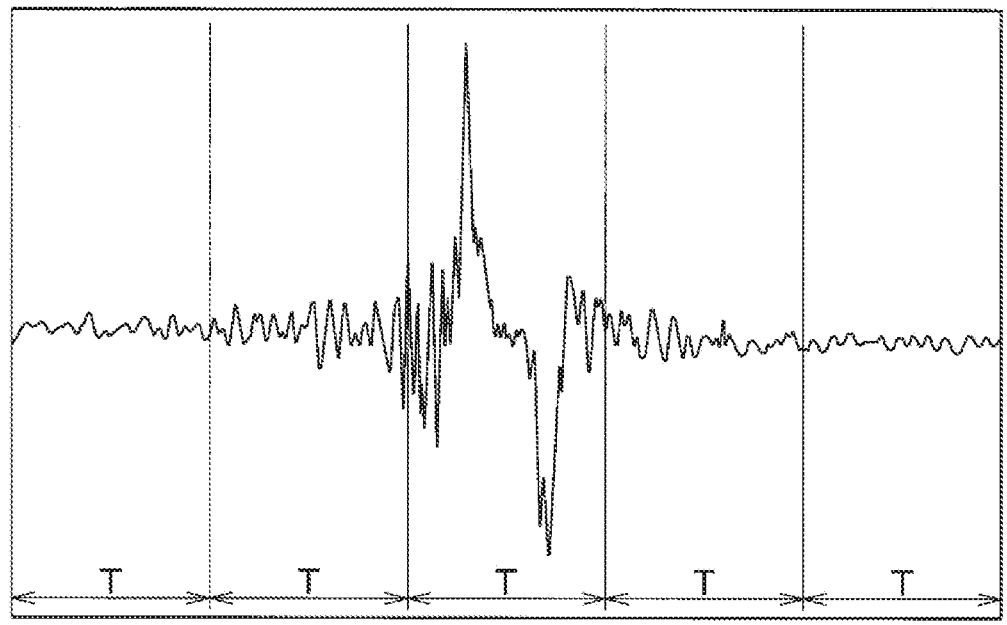
FIG. 5 is a diagram illustrating a detection signal from the acceleration acquisition unit which is segmented by each of time windows having a predetermined time width T.

Accordingly, the waveform processing unit 1b segments, by each of time windows having a predetermined time width T, the detection signal from the vibration sensor unit 1a corresponding to one rotation of the tire 3 which exhibits a continuous time axis waveform into the plurality of segments as illustrated in FIG. 5, and performs the frequency analysis in each of the segments to extract the feature quantities. Specifically, by performing the frequency analysis in each of the segments, the waveform processing unit 1b determines a power spectral value in each of the frequency bands, i.e., a vibration level in a specified frequency band, and uses the power spectral values as the feature quantities.

Note that the number of the segments resulting from the segmentation performed using the time window having the time width T is a value which varies depending on a vehicle speed, more specifically the rotating speed of the tire 3. In the following description, the number of segments corresponding to one rotation of the tire is assumed to be n (n is a natural number).

For example, the power spectral values obtained by causing the detection signal in each of the segments to pass through filters in a plurality of specified frequency bands, e.g., five bandpass filters in, e.g., a 0 to 1 kHz frequency band, a 1 to 2 kHz frequency band, a 2 to 3 kHz frequency band, a 3 to 4 kHz frequency band, and a 4 to 5 kHz frequency band are used as the feature quantities. The feature quantities are referred to as the feature vectors. When each of the power spectral values in the individual specified frequency bands is represented by $a_{ik}$, a feature vector $X_i$ of a given segment i (where i is a natural number satisfying $1 \leq i \leq n$) is given as a matrix having the power spectral values $a_{ik}$ as elements by the following expression.

$$x_i = \begin{bmatrix} a_{i1} \\ a_{i2} \\ a_{i3} \\ a_{i4} \\ a_{i5} \end{bmatrix} \quad \text{[Expression 1]}$$

Note that k in each of the power spectral values $a_{ik}$ is the number of the specified frequency bands, i.e., the number of the bandpass filters. When the 0 to 5 kHz band is segmented into the five regions as described above, k=1 to 5 is satisfied. A determinant X collectively showing feature vectors X1 to Xn of all the segments 1 to n is given by the following expression.

$$X = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \quad \text{[Expression 2]}$$

The determinant X serves as the expression representing the feature quantities corresponding to one tire rotation. The waveform processing unit 1b performs frequency analysis of the detection signal from the vibration sensor unit 1a to extract the feature quantities represented by the determinant X.

Subsequently, referring to FIGS. 6 and 7, a description will be given of an operation of a tire system including the tire device 100 and the communication center 200 each according to the first embodiment.

Figure 6:
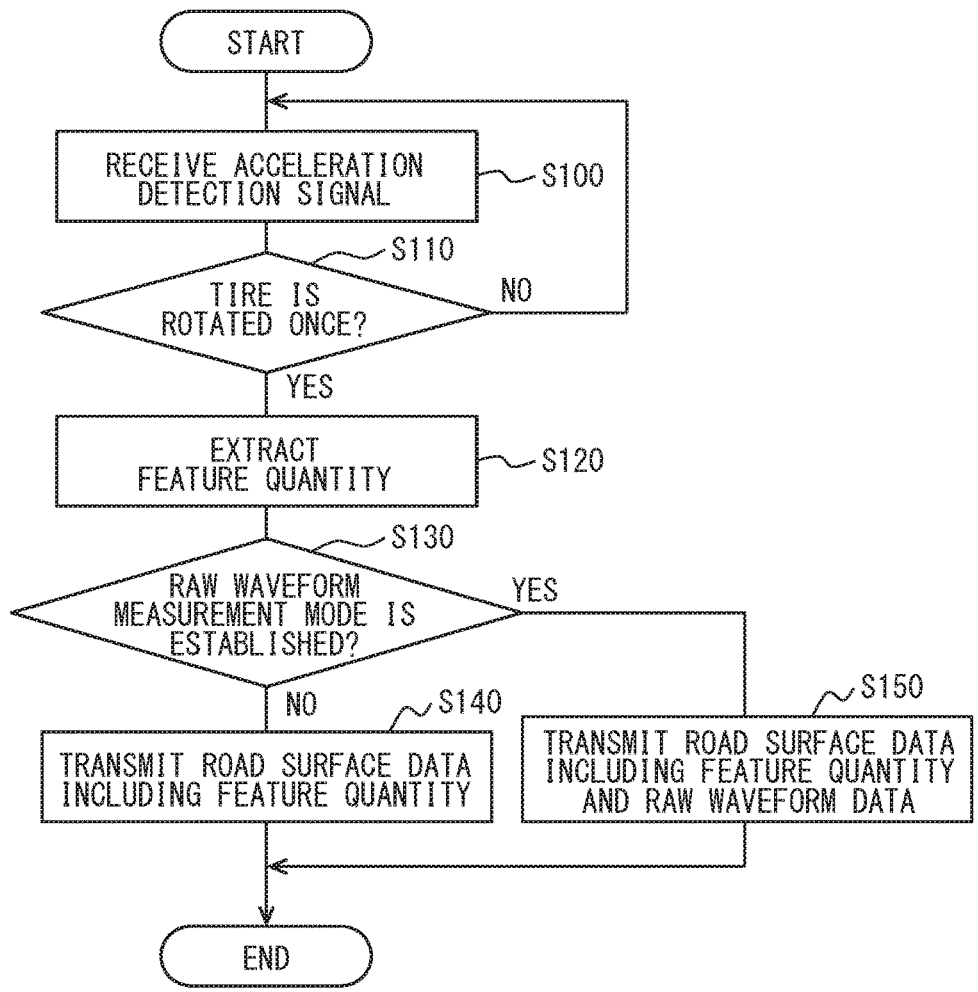
FIG. 6 is a flow chart illustrating a data transmission process performed by the tire-side device.

First, in the tire-side device 1 in each of the wheels, the waveform processing unit 1b performs a data transmission process illustrated in FIG. 6. This process is performed in each predetermined control cycle.

In S100, the waveform processing unit 1b performs a process of receiving the detection signal from the vibration sensor unit 1a. This process is continued during a period before the tire 3 rotates once in subsequent S110. Then, when receiving the detection signal corresponding to the one tire rotation from the vibration sensor unit 1a, the waveform processing unit 1b advances to subsequent S120 and extracts the feature quantity of a time axis waveform of the received detection signal from the vibration sensor unit 1a corresponding to the one tire rotation.

Note that the waveform processing unit 1b determines one rotation made by the tire 3 based on the time axis waveform of the detection signal from the vibration sensor unit 1a. Specifically, since the detection signal exhibits the time axis waveform illustrated in FIG. 4, by recognizing the first peak value and the second peak value of the detection signal, it is possible to recognize one rotation of the tire 3.

Note that the road surface state appears as a change in the time axis waveform of the detection signal particularly during a period including the "step-on region", the "pre-kick-out region", the "kick-out region", and periods before and after these regions. Accordingly, it is sufficient that data during this period is received, and it is not necessarily required that all the data sets represented by the detection signal from the vibration sensor unit 1a during one tire rotation are received. For example, with respect to the "pre-step-on region" and the "post-kick-out region", it is sufficient that there is data in the vicinity of the "step-on region" and in the vicinity of the "kick-out region". Therefore, it may also be possible to regard a region of the detection signal from the vibration sensor unit 1a where the vibration level is smaller than a threshold as a period included in the "pre-step-on region" or the "post-kick-out region" during which the detection signal is less likely to be affected by the road surface state and prevent the detection signal from being received.

The extraction of the feature quantity performed in S120 is performed in accordance with the method described above.

Then, the waveform processing unit 1b advances to S130. In S130, the waveform processing unit 1b determines whether or not a raw waveform measurement mode is established. The raw waveform measurement mode is the mode in which not only the feature quantity, but also the raw waveform of the detection signal from the vibration sensor unit 1a is requested to be transmitted as the road surface data. As will be described later, the receiver 21 determines the situation in which the support vector is to be learned based on the environment data acquired by the peripheral device 22 and, when a result of the determination indicates such a situation, the request signal is transmitted through the data communication unit 21a. When receiving the request signal, the waveform processing unit 1b determines that the raw waveform measurement mode is established.

When a negative determination is made herein, the current situation is not the situation in which the support vector is to be learned. Accordingly, the waveform processing unit 1b advances S140 and transmits the road surface data including the feature quantity extracted in the most recent control cycle to the data communication unit 1c so as to perform data transmission for the determination of the road surface state which is normally performed. As a result, the data communication unit 1c transmits the road surface data including the feature quantity.

When an affirmative determination is made in S130, there is the situation in which the support vector is to be learned. Accordingly, the waveform processing unit 1b advances to S150 and transmits the road surface data including the raw waveform data item in addition to the feature quantity extracted in the most recent control cycle to the data communication unit 1c so as to perform data transmission for learning the support vectors. As a result, the data communication unit 1c transmits the road surface data including the raw waveform data item in addition to the feature quantity.

Figure 7:
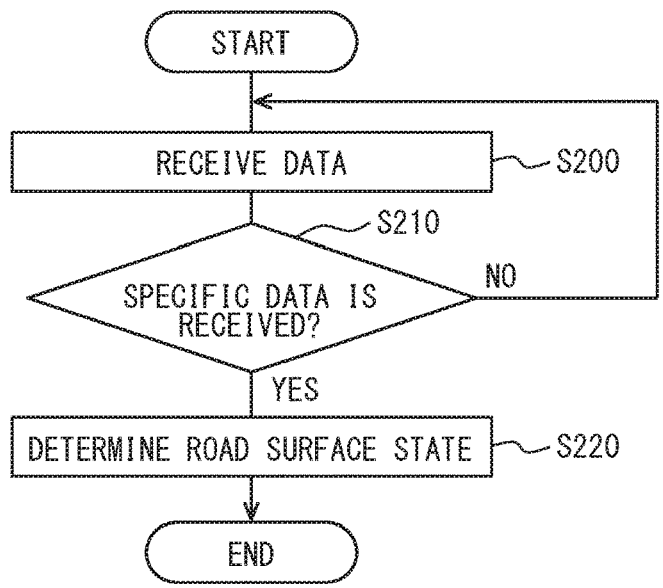
FIG. 7 is a flow chart illustrating a road surface state determination process performed by the vehicle-body-side system.
Figure 8:
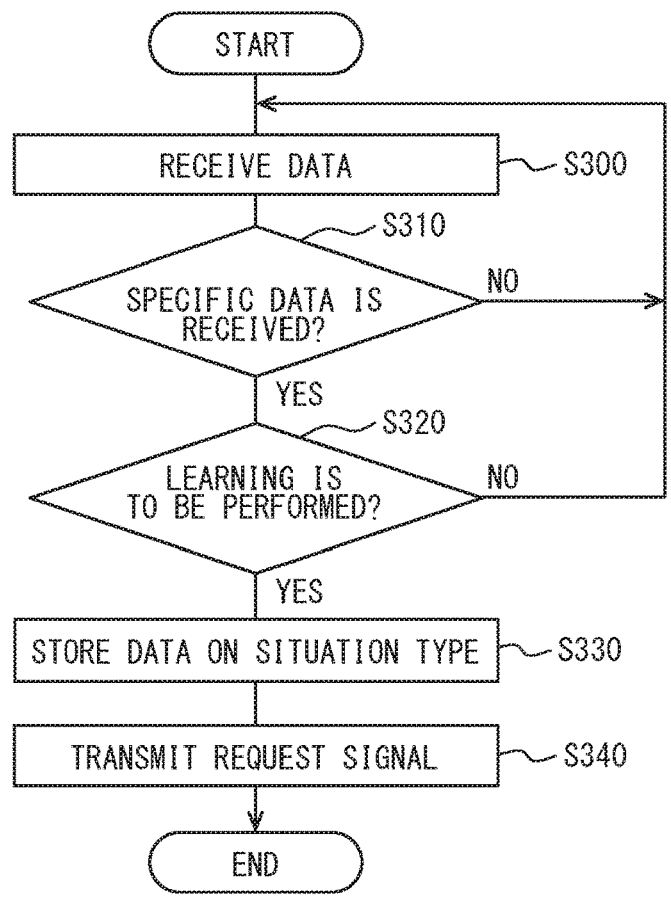
FIG. 8 is a flow chart illustrating an environment determination process performed by the vehicle-body-side system.
Figure 9:
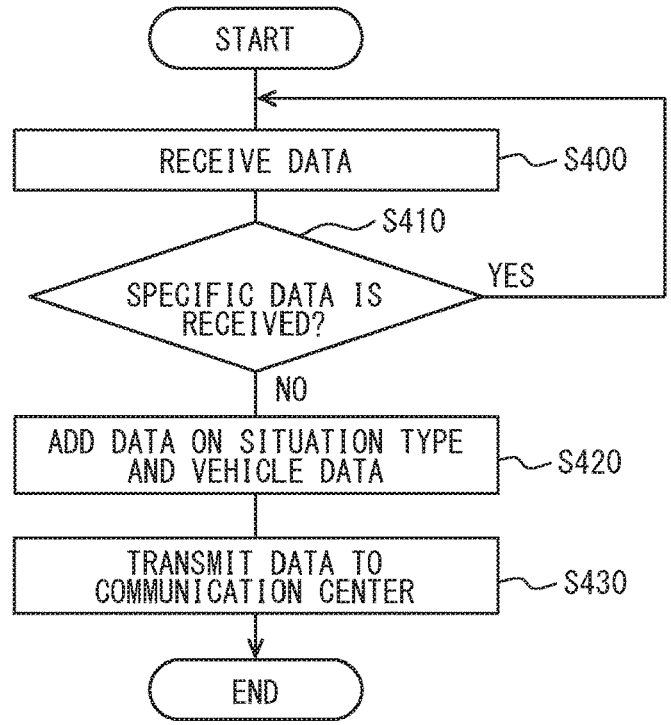
FIG. 9 is a flow chart illustrating a learning data transmission process performed by the vehicle-body-side system.
Figure 10:
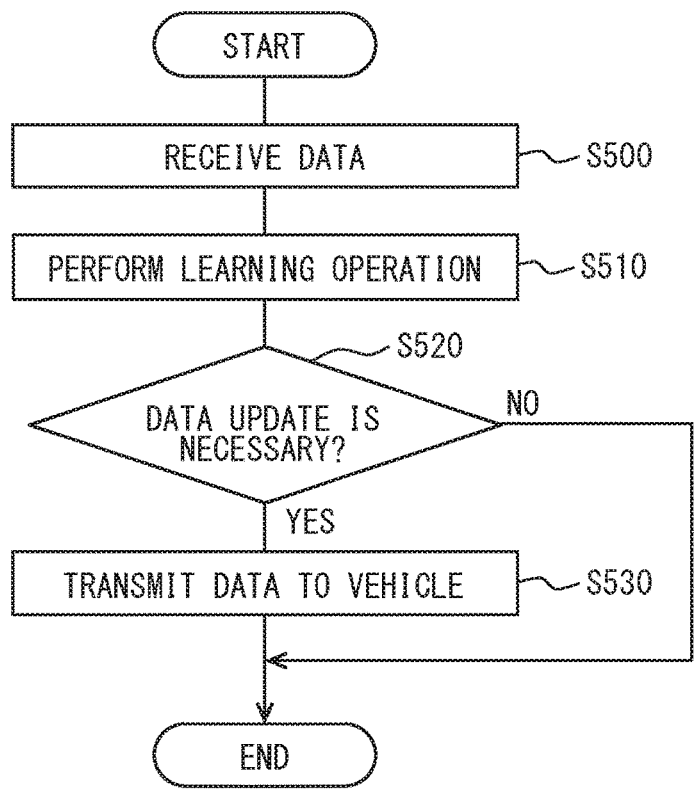
FIG. 10 is a flow chart illustrating a learning process performed by a communication center.
Figure 11:
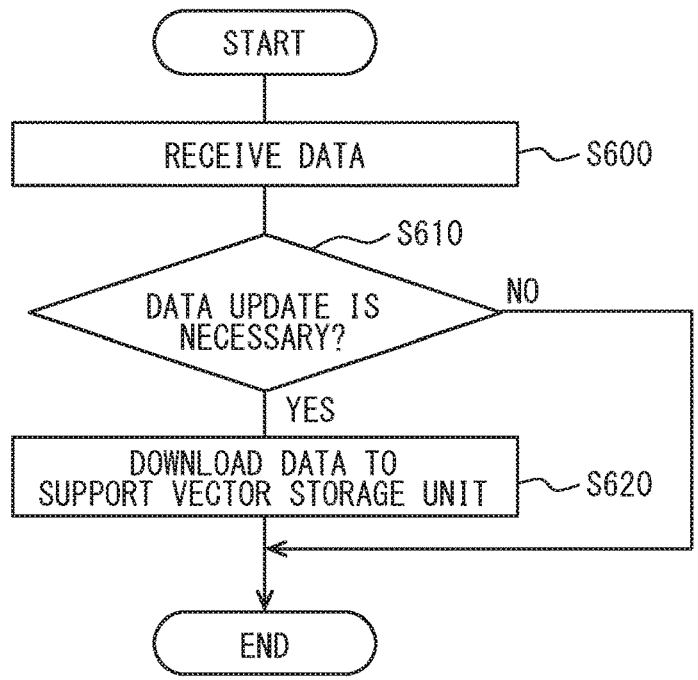
FIG. 11 is a flow chart illustrating a learning data update process performed by the vehicle-body-side system.

Meanwhile, in the receiver 21, a road surface state determination process illustrated in FIG. 7, an environment determination process illustrated in FIG. 8, a learning data transmission process illustrated in FIG. 9, and a learning data update process illustrated in FIG. 11 are performed. Basically, the road surface state determination process is performed by the road surface determination unit 21c, the environment determination process, the learning data transmission process, and the learning data update process are performed in the environment determination unit 21d and the learning data communication unit 21e. It is sufficient that the individual units included in the receiver 21 cooperate with each other to perform each of the processes. These processes are performed in each control cycle determined by a timer interrupt process or the like for each of the processes. In addition, in the communication center 200, the learning process illustrated in FIG. 10 is performed. This process is also performed in each predetermined control cycle in the communication center 200.

Note that the environment determination process, the learning data transmission process, the learning process, and the learning data update process are the processes corresponding to each other. Specifically, the learning data transmission process is performed correspondingly to the environment determination process, the learning process is performed correspondingly to the learning data transmission process, and the learning data update process is further performed correspondingly to the learning process. Accordingly, the following will describe the road surface state determination process, and then describe the environment determination process, the learning data transmission process, the learning process, and the learning data update process in this order.

First, in the road surface state determination process illustrated in FIG. 7, in S200, the data reception process is performed. When the data communication unit 21a receives the road surface data, this process is performed by the road surface determination unit 21c by retrieving the road surface data. When the data communication unit 21a has not performed the data reception, the road surface determination unit 21c ends the present process without retrieving any road surface data.

Then, the road surface determination unit 21c advances to S210 and determines whether or not there is data reception of the road surface data including the feature quantity. When the road surface data is received, the road surface determination unit 21c advances to S220. When the road surface data is not received, the road surface determination unit 21c repeats the processes in S200 and S210 until the road surface data is received. Note that the reception of the road surface data including the feature quantity is determined herein and, even when road surface data including the raw waveform data item is received, it is assumed that the road surface data is not received. However, when data related to the feature quantity is extracted from the road surface data including the raw waveform data item, the extracted data can be used for the determination of the road surface state. Accordingly, it may also be possible to determine that the road surface data is received even when the received road surface data includes the raw waveform data item.

Then, the road surface determination unit 21c advances to S220 and determines the road surface state. The determination of the road surface state is made by comparing the feature quantity included in the received road surface data to the support vector stored for each type of the road surface in the road surface determination unit 21c. For example, the road surface determination unit 21c determines the degree of similarity of the feature quantity to the support vector stored for each type of the road surface, and determines that the road surface corresponding to the support vector having the highest degree of similarity is the currently traveled road surface.

For example, the calculation of the degree of similarity of the feature quantity to the support vector stored for each type of the road surface can be performed by a method as described below.

As described above, it is assumed with respect to the determinant X representing the feature quantities that a determinant representing the feature quantities is X(r), a determinant representing the support vectors is X(s), and the power spectral values $a_{ik}$ serving as respective elements of each of the determinants are represented by $a(r)_{ik}$ and $a(s)_{ik}$. In that case, the determinant X(r) representing the feature quantities and the determinant X(s) representing the support vectors are represented as follows.

$$x(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{[Expression 3]}$$

$$x(s) = \begin{pmatrix} a(s)_{11} & a(s)_{21} & \cdots & a(s)_{n1} \\ a(s)_{12} & a(s)_{22} & \cdots & a(s)_{n2} \\ a(s)_{13} & a(s)_{23} & \cdots & a(s)_{n3} \\ a(s)_{14} & a(s)_{24} & \cdots & a(s)_{n4} \\ a(s)_{15} & a(s)_{25} & \cdots & a(s)_{n5} \end{pmatrix} \quad \text{[Expression 4]}$$

The degree of similarity represents a degree to which the feature quantities and the support vectors which are represented by the two determinants are similar to each other, and indicates that, as the degree of similarity is higher, the two determinants are more similar to each other. In the first embodiment, the road surface determination unit 21c determines the degree of similarity using a kernel method, and determines the road surface state based on the degree of similarity. The road surface determination unit 21c calculates herein an inner product of the determinant X(r) representing the feature quantities and the determinant X(s) representing the support vectors, i.e., a distance between respective coordinates represented by the individual feature vectors Xi of the individual segments resulting from the segmentation using each of the time windows having the predetermined time width T in a feature space, and uses the inner product as the degree of similarity.

Figure 12:
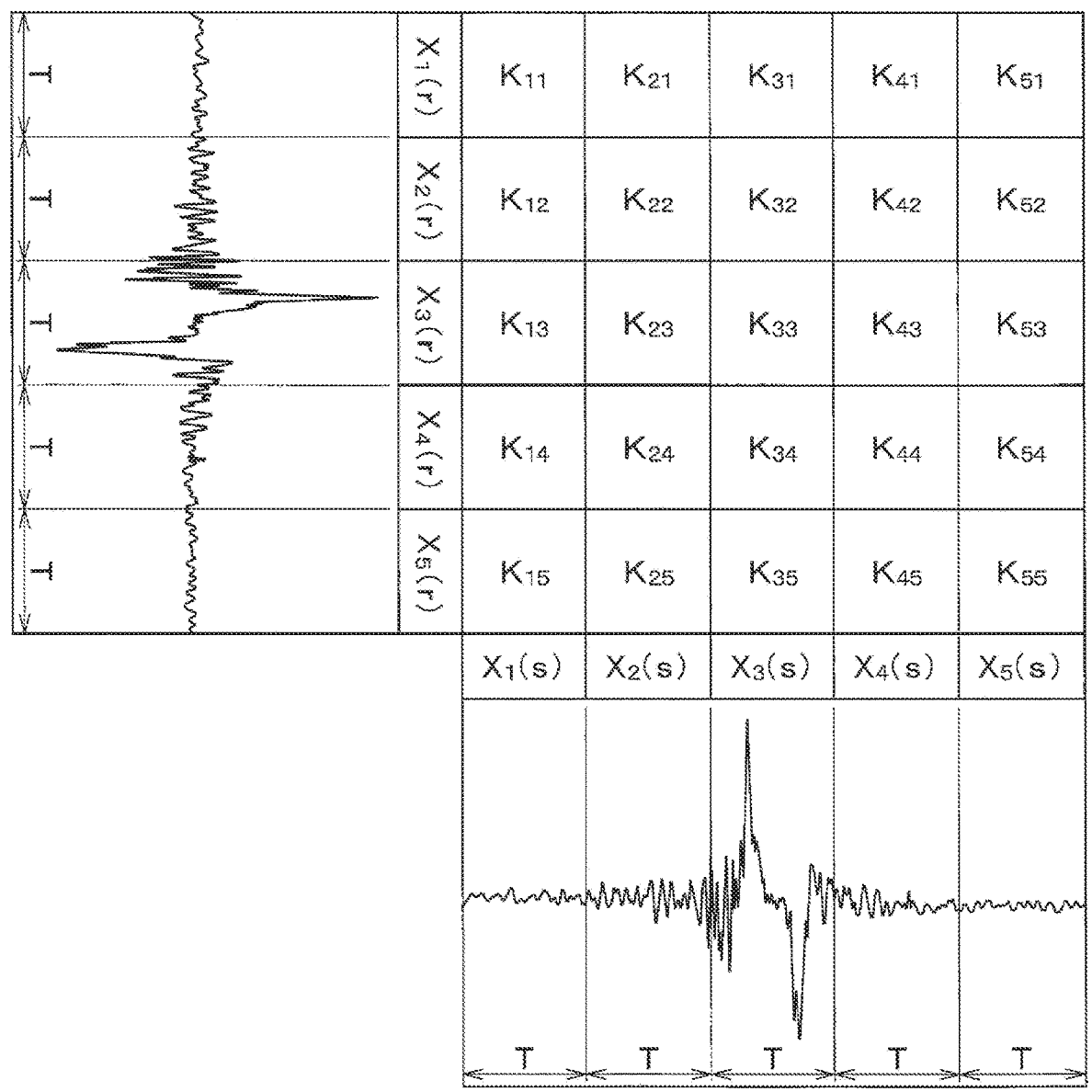
FIG. 12 is a diagram illustrating respective relationships between determinants $Xi(r)$ and $Xi(s)$ and a distance $_{yz}$ in each of segments obtained by dividing, by each of the time windows having the predetermined time width T, a time axis waveform during a most recent tire rotation and a time axis waveform during an immediately previous tire rotation.

For example, as illustrated in FIG. 12, as the time axis waveform of the detection signal from the vibration sensor unit 1a, each of the time axis waveform during the most recent rotation of the tire 3 and the time axis waveform of the support vectors is segmented into individual segments by the time window having the predetermined time width T. In the case of the illustrated example, each of the time axis waveforms is segmented into the five segments, and accordingly n=5 is satisfied, and i is given by 1≤i≤5. It is assumed herein that, as illustrated in FIG. 12, the feature vectors Xi of the individual segments during the most recent rotation of the tire 3 are Xi(r), and the feature vectors of the individual segments of the support vectors are Xi(s). In that case, distances $K_{yz}$ between the coordinates represented by the feature vectors Xi of the individual segments are represented as in cells where cells containing the feature vectors Xi(r) of the individual segments during the most recent rotation of the tire 3, which are arranged laterally thereto, and cells containing the feature vectors Xi(s) of the individual segments of the support vectors, which are arranged vertically thereto, cross each other. Note that, in each of the distances $K_{yz}$, y corresponds to i in Xi(s), while z corresponds to i in Xi(r). Actually, depending on the vehicle speed, the number of the segments during the most recent rotation of the tire 3 may be different from the number of the segments of the support vectors. However, a case where the number of the segments during the most recent rotation of the tire 3 is similar to the number of the segments of the support vectors is shown by way of example.

In the first embodiment, the feature vectors are acquired by segmenting each of the time axis waveforms into the five specified frequency bands. Consequently, the feature vectors Xi of the individual segments are represented in a six-dimensional space including the time axis, and the distances between the coordinates represented by the feature vectors Xi of the individual segments correspond to distances between the coordinates in the six-dimensional space. However, since the distances between the coordinates represented by the feature vectors of the individual segments are smaller as the feature quantities and the support vectors are more similar to each other and larger as the feature quantities and the support vectors are less similar to each other, smaller distances represent a higher degree of similarity, while larger distances represent lower degrees of similarity.

For example, when segments 1 to n are provided by time division, each of the distances $K_{yz}$ between the coordinates represented by the feature vectors of the individual segments 1 is given by the following expression.

$$Kyz = \sqrt{\{a(r)_{11} - a(s)_{11}\}^2 + \{a(r)_{12} - a(s)_{12}\}^2 + \cdots \{a(r)_{15} - a(s)_{15}\}^2} \quad \text{[Expression 5]}$$

Thus, the distances $K_{yz}$ between the coordinates represented by the feature vectors of the individual segments obtained by time division are determined for all the segments, a total sum $K_{total}$ of the distances $K_{yz}$ for all the segments is calculated, and the total sum $K_{total}$ is used as a value corresponding to the degree of similarity. Then, the total sum $K_{total}$ is compared to a predetermined threshold Th and, when the total sum $K_{total}$ is larger than the threshold Th, it is determined that the degree of similarity is low. When the total sum $K_{total}$ is smaller than the threshold Th, it is determined that the degree of similarity is high. Such calculation of the degree of similarity is performed with respect to all the support vectors, and it is determined that the type of the road surface corresponding to the support vectors having the highest degree of similarity is the currently traveled road surface state. Thus, the road surface state can be determined.

Note that, as a value corresponding to the degree of similarity, the total sum $K_{total}$ of the distances $K_{yz}$ each between the two coordinates represented by the feature vectors of the individual segments is used, but it is also possible to use another value as a parameter indicative of the degree of similarity. For example, as the parameter indicative of the degree of similarity, an average distance $K_{ave}$ as an average value of the distances $K_{yz}$, which is obtained by dividing the total sum $K_{total}$ by the number of the segments, can be used. Alternatively, it is also possible to determine the degree of similarity using various kernel functions. Still alternatively, it may also be possible to calculate the degree of similarity by removing paths having lower degrees of similarity from all the feature vectors without using all the feature vectors.

Next, a description will be given of the environment determination process to be performed by the receiver 21.

As illustrated in FIG. 8, in S300, a data reception process is performed. This process is performed by the environment determination unit 21d by receiving the environment data from the peripheral device 22. When the environment determination unit 21d has not performed the data reception, the environment determination unit 21d ends the current process without retrieving any environment data.

Then, the environment determination unit 21d advances to S310 and determines whether or not there is data reception. When data is received, the environment determination unit 21d advances to S320. When no data is received, the environment determination unit 21d repeats the processes in S300 and S310 until data is received.

Then, in S320, the environment determination unit 21d determines whether or not there is the situation in which the support vector is to be learned based on the environment data. When the current situation corresponds to the "situation in which the support vector is to be learned", the environment determination unit 21d makes an affirmative determination and advances to processes in S330. When the current situation does not correspond to the "situation in which the support vector is to be learned", the environment determination unit 21*d* makes a negative determination and repeats the processes in S300 and S310.

In S330, the environment determination unit 21*d* stores data on the type of the situation when it is determined that there is the "situation in which the support vector is to be learned". This data is stored until this data is overwritten by the process performed in S330 as a result of an affirmative determination made subsequently in S320. Then, the environment determination unit 21*d* advances to S340, gives an instruction to transmit the request signal to the data communication unit 21*a*, and ends the process. As a result, the request signal is transmitted to each of the tire-side devices 1 through the data communication unit 21*a*.

Next, a description will be given of the learning data transmission process to be performed by the receiver 21.

As illustrated in FIG. 9, in S400, a data reception process is performed. When the data communication unit 21*a* receives the road surface data, this process is performed by the learning data communication unit 21*e* by retrieving the road surface data. When the data communication unit 21*a* has not performed the data reception, the learning data communication unit 21*e* ends the current process without retrieving any road surface data.

Then, the learning data communication unit 21*e* advances to S410 and determines whether or not there is data reception. When data is received, the learning data communication unit 21*e* advances to S420. When no data is received, the learning data communication unit 21*e* repeats the processes in S400 and S410 until data is received. Note that the reception of the road surface data including the raw waveform data item in addition to the feature quantity is determined herein and, even when road surface data not including the raw waveform data item is received, it is assumed that the road surface data is not received.

Then, in S420, the learning data communication unit 21*e* generates data by adding, to the road surface data when it is determined that there is the situation in which learning is to be performed, the data on the situation in which the support vector is to be learned which has been stored by the environment determination unit 21*d* in the environment determination process described above and vehicle data such as the ID information of the subject vehicle. Subsequently, the learning data communication unit 21*e* advances to S430 and transmits the data generated in S420 to the communication center 200. Thus, the road surface data including the raw waveform data item in addition to the feature quantity, the data on the situation type, and the vehicle data for distinguishing the subject vehicle from another vehicle are transmitted to the communication center 200 provided outside the vehicle through the external communication device 25. The road surface data, the situation type data, and the vehicle data are accumulated in the communication center 200.

Subsequently, a description will be given of the learning process to be performed by the communication center 200.

As illustrated in FIG. 10, in S500, a data reception process is performed. In this process, the communication center 200 performs a process of receiving the data transmitted in S430 in FIG. 9. Then, the communication center 200 advances to S510, reads, for each of the vehicles and for each type of the situation, the feature quantity and the raw waveform data item from the road surface data based on the data received in S500, analyzes the read feature quantity and data, and performs various arithmetic operations, to perform a leaning operation of learning the support vector for each type of the situation.

Then, the communication center 200 advances to S520 and determines whether or not data update is necessary based on a result of the learning operation. For example, in a case where an amount of data collected for the learning operation is small and the support vector has not been obtained or where the result of the learning operation remains unchanged from the currently stored support vector, the communication center 200 determines that data update is not necessary. When making an affirmative determination in S520 as in a case where the support vector is obtained successfully and the obtained support vector is different from the currently stored support vector, the communication center 200 advances to S530. As a result, the communication center 200 performs data transmission of the vehicle data for causing the vehicle to determine that the data is related thereto and the support vector associated with the situation type. The vehicle data, the support vector tied to the situation type, and the road surface state represented by the road surface data are also accumulated in the communication center 200. This configuration allows data on the support vector learned for each set of the vehicle data, data on the road surface state of a road surface traveled by the vehicle, and the like to be accumulated and allows the accumulated data to be effectively used. When making a negative determination in S520, the communication center 200 immediately ends the process.

Subsequently, a description will be given of the learning data update process to be performed by the receiver 21.

As illustrated in FIG. 11, in S600, a data reception process is performed. In this process, the receiver 21 performs a process of receiving the data transmitted in S530 in FIG. 10. Then, the receiver 21 advances to S610 and determines whether or not it is necessary to update the support vector currently stored in the support vector storage unit 21*b* based on the data received in S600. When the received data includes support vector different from the support vector currently stored in the support vector storage unit 21*b*, the receiver 21 determines that it is necessary to update the support vectors, and advances to S620.

Then, in S620, the receiver 21 performs data transmission to the support vector storage unit 21*b* to update the data stored in the support vector storage unit 21*b*, and ends the process. When making a negative determination in S610 as in a case where the received data does not include support vector different from the support vector currently stored in the support vector storage unit 21*b*, the receiver 21 ends the process without performing data update.

As described above, in the tire system including the tire device 100 and the communication center 200 of the first embodiment, the peripheral device 22 provided in the vehicle acquires the environment data and determines that there is the situation in which the support vector is to be learned based on the environment data. Then, when there is the situation in which the support vector is to be learned, the peripheral device 22 ties, to the situation type, the road surface data including the feature quantity and the raw waveform data item, transmits the road surface data to the communication center 200, and causes the communication center 200 to perform the learning operation of learning the support vector. Accordingly, by causing the communication center 200 to transmit a result of the learning to the vehicle, it is possible to not only use the support vector stored as initial data in the support vector storage unit 21*b*, but also update the support vector depending on a situation. In other words, it is possible to evolve an algorithm from the time of vehicle delivery using the communication center 200.

Therefore, it is possible to provide the tire device 100 and the tire system having the tire device 100 each of which can appropriately determine the road surface state even in a case which cannot be handled using the pre-learned stored data.

Second Embodiment

A description will be given of a second embodiment. In contrast to the first embodiment, the second embodiment causes the tire-side device 1 to store the support vector. The second embodiment is otherwise similar to the first embodiment, and therefore a description will be given only of portions different from those in the first embodiment.

Figure 13:
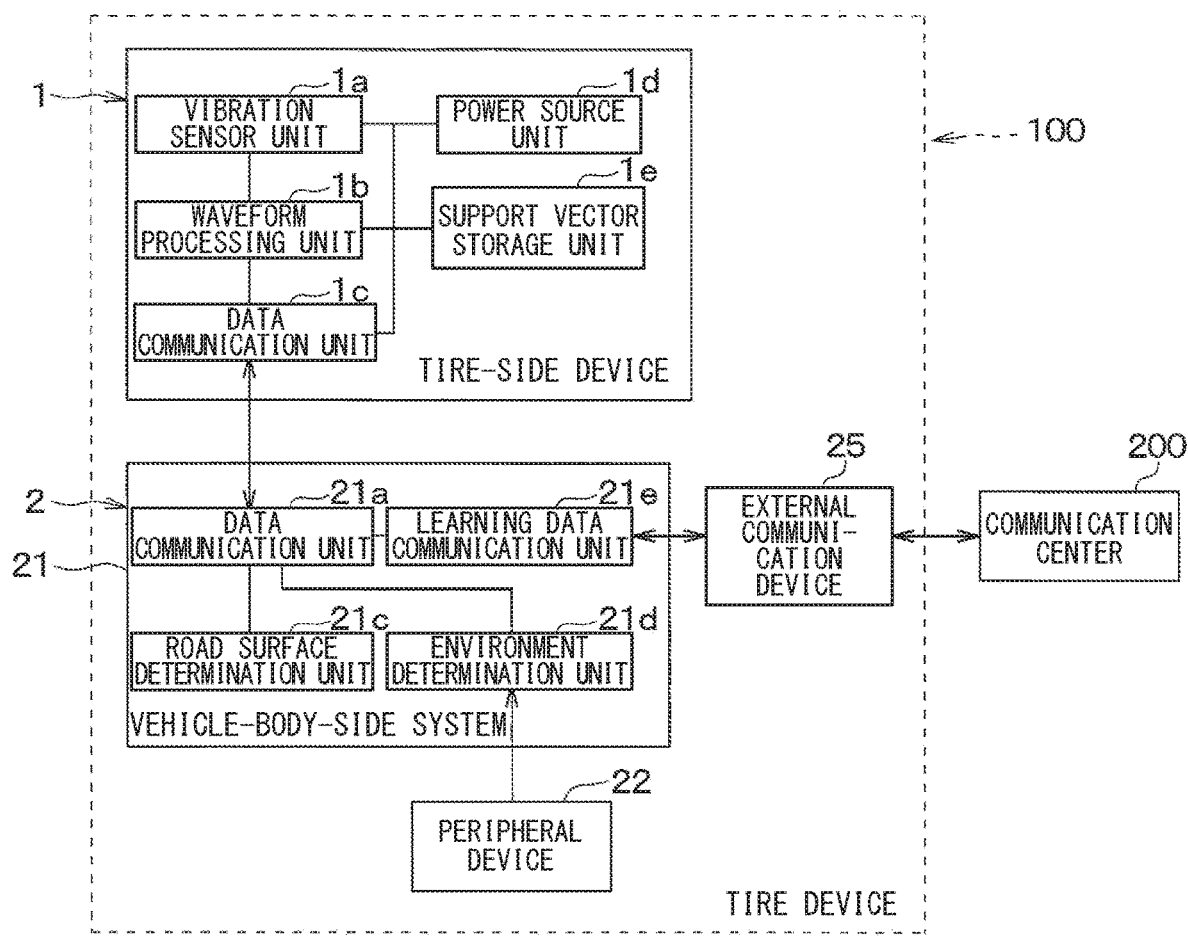
FIG. 13 is a block diagram illustrating details of a tire-side device and a vehicle-body-side system which are provided in a tire device according to a second embodiment.

As illustrated in FIG. 13, in the second embodiment, the tire-side device 1 includes a support vector storage unit 1e to be able to determine the road surface state. Note that data on support vector stored in advance in the support vector storage unit 1e at the time of vehicle delivery is similar to that stored in the support vector storage unit 21b, which is described in the first embodiment.

In such a configuration, the waveform processing unit 1b of the tire-side device 1 is capable of determining the road surface state based on the feature quantity extracted from the detection signal from the vibration sensor unit 1a and on the data stored in the support vector storage unit 1e. Then, the data communication unit 1c transmits data representing a result of the determination of the road surface state to the receiver 21, and the road surface determination unit 21c determines the road surface state based on a result of the determination indicated by the data transmitted from the tire-side device 1 and transmits the determined road surface state to the notification device 24.

When there is a request for the road surface data from the receiver 21 based on the environment data from the environment determination unit 21d, the tire-side device 1 transmits the road surface data including the raw waveform data item in addition to the feature quantity to the communication center 200 through each of the receiver 21 and the external communication device 25. As a result, similarly to the first embodiment, the communication center 200 is used as a cloud provider computer to perform a learning operation of learning support vector and transmit a result of the learning operation to the receiver 21 through the external communication device 25. In addition, when the learning data communication unit 21e determines that it is necessary to update the support vector currently stored in the support vector storage unit 1e, the data communication unit 21a transmits, to the tire-side device 1, data on the support vector to be updated. Then, in addition to the support vector stored in the support vector storage unit 1e, data on new support vector is stored.

In the tire device 100 of the second embodiment, the tire-side device 1, the receiver 21, and the communication center 200 basically perform the similar processes to the processes performed in the first embodiment, i.e., the similar processes to processes illustrated in FIGS. 6 to 11, except that an operation as described above is performed.

Figure 14:
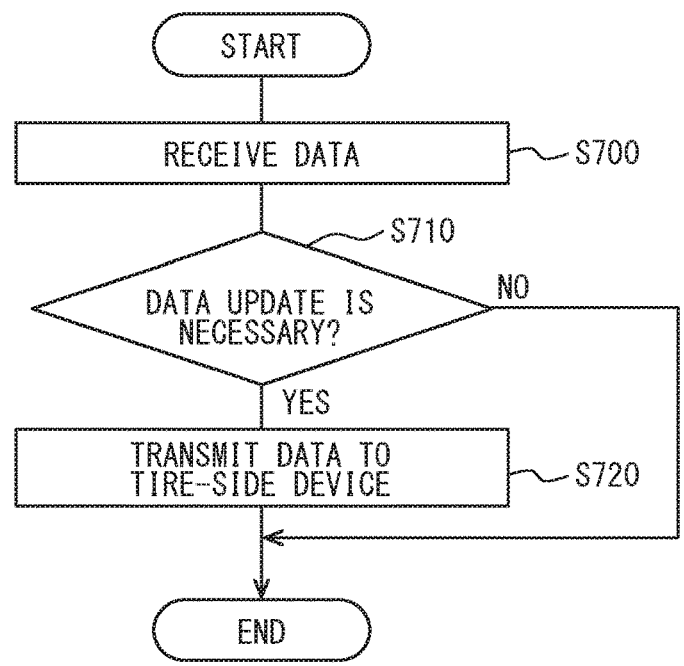
FIG. 14 is a flow chart illustrating a learning data update process performed by the vehicle-body-side system.

However, in S120 in FIG. 6, the determination of the road surface state is also performed in addition to the extraction of the feature quantity. In S140, data representing a result of the determination of the road surface state is transmitted, though it may also be possible to transmit the road surface data including the feature quantity. As the learning data update process, a process illustrated in FIG. 14 is performed instead of the process illustrated in FIG. 11. Specifically, in S700 to S710 illustrated in FIG. 14, the similar processes as those performed in S600 to S610 illustrated in FIG. 11 are performed and then, in S720, data on the support vector to be updated is transmitted to the tire-side device 1. Note that, in S710, it is determined whether or not the support vector currently stored in the support vector storage unit 1e need to be updated. For the determination, the data transmitted form the communication center 200 is to include data indicating that the currently stored support vector have contents to be updated so as to allow the receiver 21 to determine that the support vector is to be updated when the data of concern is included.

Thus, it is also possible to allow the tire-side device 1 to include the support vector storage unit 1e and allow the tire-side device 1 to perform the determination of the road surface state. Then, it may also be possible to update the support vector stored in the support vector storage unit 1e included in the tire-side device 1 based on a result of the learning in the communication center 200. This also allows the similar effects obtained in the first embodiment to be obtained.

Third Embodiment

A description will be given of a third embodiment. The third embodiment is intended to effectively use the data accumulated in the communication center 200, as described in the first embodiment. The accumulation of the data in the communication center 200 or the like is similar to in the first and second embodiments, and therefore a description will be given only of portions different from those in the first and second embodiments.

As described in the first embodiment, in addition to the road surface data transmitted from each of the vehicles, the data on the situation type, and the vehicle data, the support vector serving as learning data are increasingly accumulated in the communication center 200. As a result, for a vehicle of the similar vehicle type and a vehicle having the similar tires, the various data accumulated in the communication center 200 may be diverted. Accordingly, when the various data preliminarily transmitted from the vehicles and the calculated support vectors are accumulated in the communication center 200, the various data and the support vectors are allowed to be used extensively in another vehicle. Specifically, the other vehicle performs the processes illustrated in FIGS. 15 and 16 to effectively use the data.

Note that the other vehicle also includes the tire-side devices 1 and the vehicle-body-side system 2 which are illustrated in FIG. 2. Accordingly, each of the tire-side devices 1 performs the process illustrated in FIG. 6, while the vehicle-body-side system 2 performs the process illustrated in FIGS. 7 to 9 and 11. Also, the communication center 200 performs the process illustrated in FIG. 10. In addition, the vehicle-body-side system 2 performs a download request process illustrated in FIG. 15, while the communication center 200 performs a data download process illustrated in FIG. 16.

Figure 15:
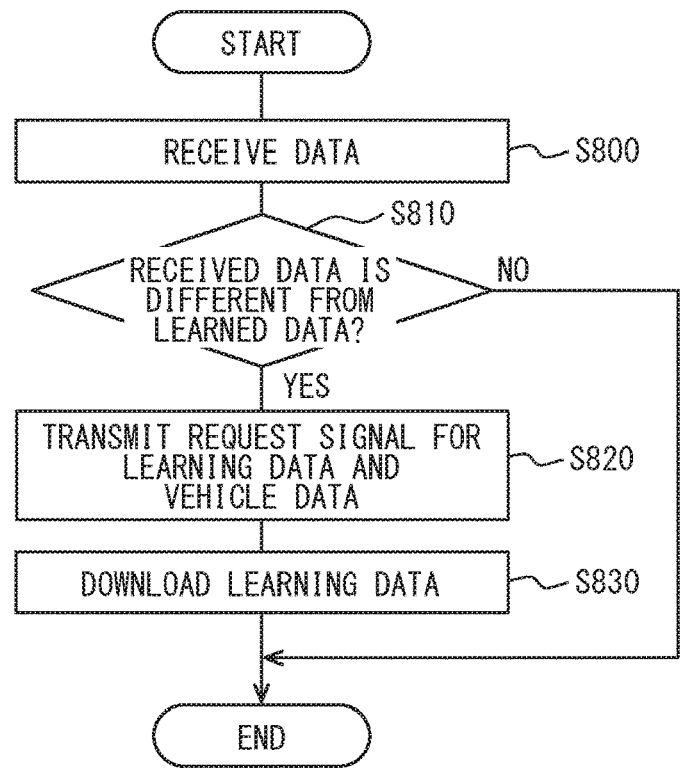
FIG. 15 is a flow chart illustrating a download process performed by the vehicle-body-side system.

First, as illustrated in FIG. 15, the vehicle-body-side system 2 performs a data reception process in S800. This process is similar to the process performed in S200 in FIG. 7. Subsequently, in S810, the vehicle-body-side system 2 determines whether or not received data is different from the learned data. For example, the vehicle-body-side system 2 calculates the degree of similarity of feature quantity included in the received data to all the support vectors stored in the support vector storage unit 21b. Then, when there are the support vectors having the low degrees of similarity, it is considered that the learned support vectors do not include that corresponding to the type of the road surface which matches the road surface state of the currently traveled road surface. Therefore the vehicle-body-side system 2 determines that the received data does not match with the learned data, that is, the learning data that is stored. Alternatively, when the environment data obtained from the peripheral device 22, not the data received from the tire-side device 1 in S800, represents a condition different from the learning condition under which the learned support vectors were extracted, it may also be possible to determine that the environment data is different from the learned data.

When making a negative determination in S810, the vehicle-body-side system 2 immediately ends the process. When making an affirmative determination, the vehicle-body-side system 2 advances to S820. In S820, the vehicle-body-side system 2 transmits, together with the vehicle data for distinguishing the subject vehicle from another vehicle, a request signal for the learning data to the communication center 200 serving as the cloud provider computer. As the vehicle data, data which allows the subject vehicle to be distinguished from another vehicle may be used appropriately as described above but, by causing the vehicle data to include detailed data, such as the type of the tire 3, it is possible to make a request for the learning data more closely corresponding to a situation of the subject vehicle. When data on the situation type is also transmitted, it is also possible to make a request for the learning data corresponding to the situation type. Then, since the learning data is transmitted thereto from the communication center 200 based on the process illustrated in FIG. 16 described later, the vehicle-body-side system 2 downloads the learning data in S830.

Figure 16:
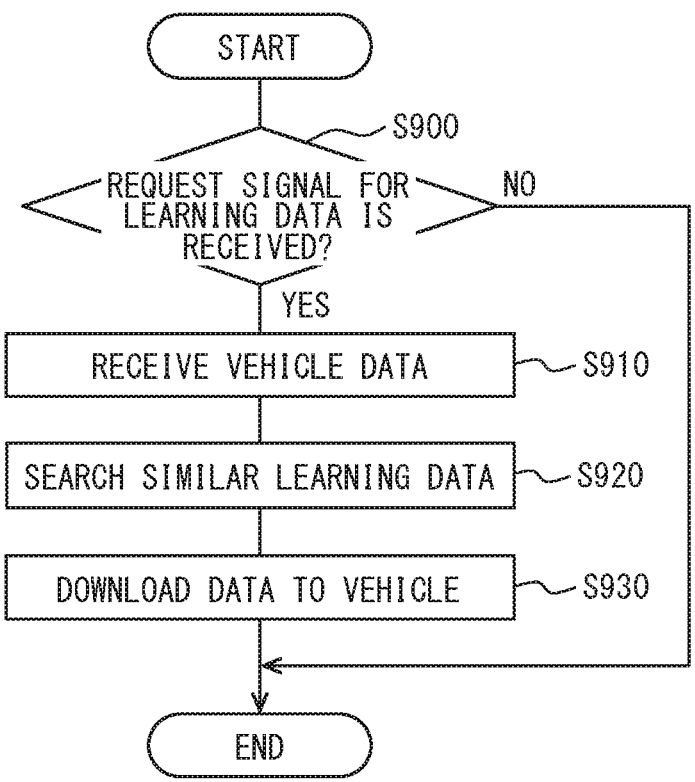
FIG. 16 is a flow chart illustrating a data download process performed by the communication center.

Meanwhile, as illustrated in FIG. 16, the communication center 200 determines whether or not the request signal for the learning data is received from the vehicle in S900. When making a negative determination herein, the communication center 200 immediately ends the process. When making an affirmative determination herein, the communication center 200 advances to S910. When the request signal for the learning data is transmitted in S820 described above, the communication center 200 makes the affirmative determination in S900.

Subsequently, in S910, the communication center 200 performs a process of receiving the vehicle data transmitted together with the request signal for the learning data. Then, the communication center 200 advances to S920 and retrieves learning data similar to the vehicle data. For example, from among the data accumulated in the communication center 200, the learning data for a vehicle of the similar vehicle type, a vehicle having the similar tires, or a vehicle of the similar vehicle type having the same tires is retrieved as the similar learning data. Then, the communication center 200 advances to S930 and transmits the data accumulated in the communication center 200 and the learning data as the support vector so as to cause the vehicle that has transmitted the request signal for the learning data to download the learning data. At this time also, by transmitting the vehicle data together with the learning data, it is possible to specify the vehicle which is intended to download the learning data.

Thus, the various data and the learning data as the support vectors which are accumulated in the communication center 200 are transmitted to the other vehicle. This configuration allows the other vehicle to effectively use the data and perform the determination of the road surface state or the like. In particular, by causing the data to include data on the situation type in addition to the vehicle data, it is possible to transmit, to the other vehicle, the learning data to which the situation type is added and more reliably perform the determination of the road surface state or the like.

In addition, since data on the road surface state of the road surface previously traveled by the vehicle and the like are also accumulated in the communication center 200, by transmitting the data to the other vehicle, the other vehicle is allowed to preliminarily know the data on the road surface state of even a road surface which has not been traveled by the other vehicle. In that case, the other vehicle need not perform data acquisition for determining the road surface state.

Note that, in the second embodiment, the tire-side device 1 includes the support vector storage unit 1*e*. Accordingly, the tire-side device 1 may appropriately determine whether or not the newly obtained data is different from the leaned data. When the newly obtained data is different from the learned data, the tire-side device 1 may appropriately transmit the request signal to the vehicle-body-side system 2.

Fourth Embodiment

A description will be given of a fourth embodiment. The fourth embodiment describes a specific example of the "situation in which the support vector is to be learned" described in the first embodiment, and is otherwise similar to the first embodiment. Accordingly, a description will be given only of portions different from those in the first embodiment.

As described in the first embodiment, when a condition is different from the learning condition under which the support vector was extracted is established, it is considered to learn the learning data as a preferred "situation in which the support vector is to be learned". In the fourth embodiment, a description will be given of a specific example of the "situation in which the support vector is to be learned". In the fourth embodiment, a description will be given also of a case where the vehicle-body-side system 2 transmits an instruction to transmit the road surface data, such as the raw waveform data item, to the tire-side device 1 when the vehicle-body-side system 2 determines that there is the "situation in which the support vector is to be learned" based on the environment data from the peripheral device 22. However, this is an exemplary, and a method as described in the first embodiment may also be used. Specifically, when the vehicle-body-side system 2 determines the "situation in which the support vector is to be learned" in response to the reception of the road surface data, such as the raw waveform data item from the tire-side device 1, the road surface data already received may be transmitted to the communication center 200.

First, in the receiver 21, the environment determination unit 21*d* or the like performs each process illustrated in FIGS. 17 to 24. These processes correspond to individual segments obtained by segmenting the environment determination process illustrated in FIG. 8 and described in the first embodiment according to the contents of determinations to be made. The processes are performed herein in independent flows such as, e.g., a timer interrupt process, but may also be performed in one flow.

Figure 17:
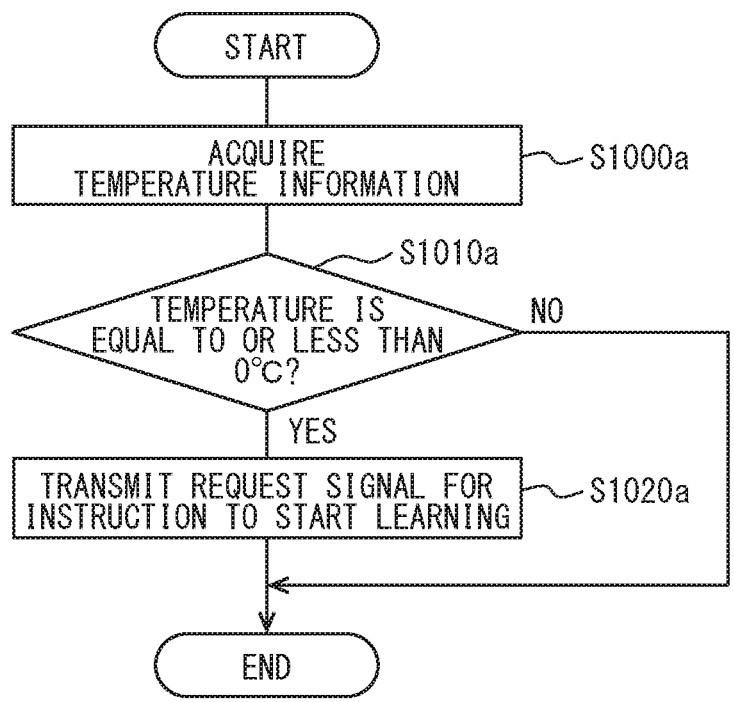
FIG. 17 is a flow chart illustrating a specific example of an environment determination process performed by the vehicle-body-side system.

In FIG. 17, in S1000*a*, a process of acquiring temperature information of an outside temperature is performed. The environment determination unit 21*d* or the like performs this process by acquiring the temperature information using, e.g., a navigation system as the peripheral device 22. Then, the environment determination unit 21*d* or the like advances to S1010*a* and determines whether or not the outside temperature acquired most recently is 0° C. or less. Specifically, when the situation in which the support vector was learned is in an environment such that an ambient temperature is, e.g., about 25° C. and a temperature having a difference corresponding to a predetermined temperature or more with the ambient temperature is reached, it is determined herein that there is the "situation in which the support vector is to be learned" if the outer temperature is 0° C. or less. When making an affirmative determination, the environment determination unit 21d or the like advances to S1020a, outputs a request signal for an instruction to start learning to the tire-side device 1 and to the communication center 200, and ends the process.

Figure 18:
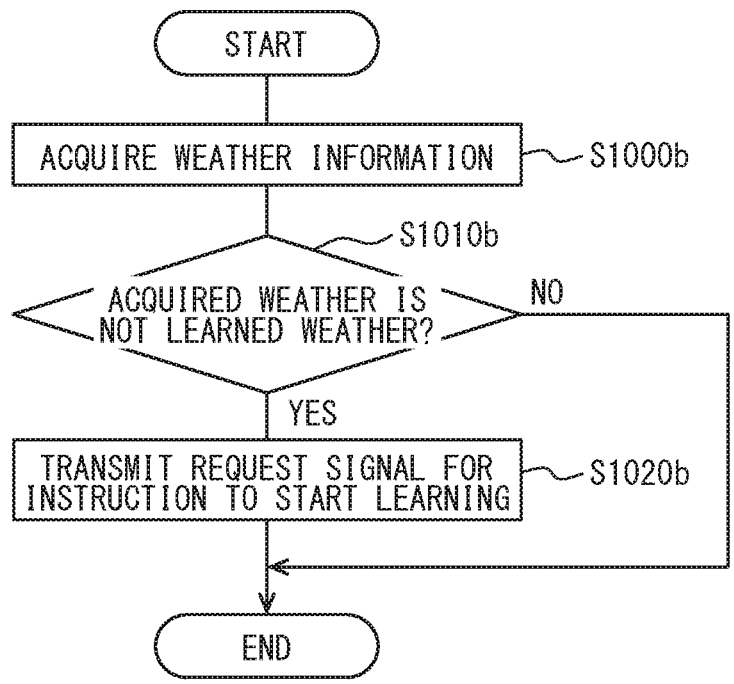
FIG. 18 is a flow chart illustrating a specific example of the environment determination process to be performed by the vehicle-body-side system.

In FIG. 18, in S1000b, a process of acquiring weather information is performed. The environment determination unit 21d or the like also performs this process by acquiring the weather information using, e.g., the navigation system as the peripheral device 22. Then, the environment determination unit 21d or the like advances to S1010b and determines whether or not the weather acquired most recently is weather with which the environment determination unit 21d or the like has not been learned such as, e.g., heavy rainfall or strong wind. Assumed that the weather in the situation in which the support vector was learned was such that, e.g., an amount of rainfall per unit time was a predetermined amount or less or a wind speed was a predetermined value or less. In this case, when an environment is such that the amount of rainfall or the wind speed is more than that in the situation in which the support vector was learned, the environment determination unit 21d or the like determines that there is the "situation in which the support vector is to be learned". When making an affirmative determination, the environment determination unit 21d or the like advances to S1020b, performs the same process as performed in S1020a described above, and ends the process. Note that the heavy rainfall or the strong wind is mentioned herein as an example of the weather information but, needless to say, another information is also applicable to the weather information.

Figure 19:
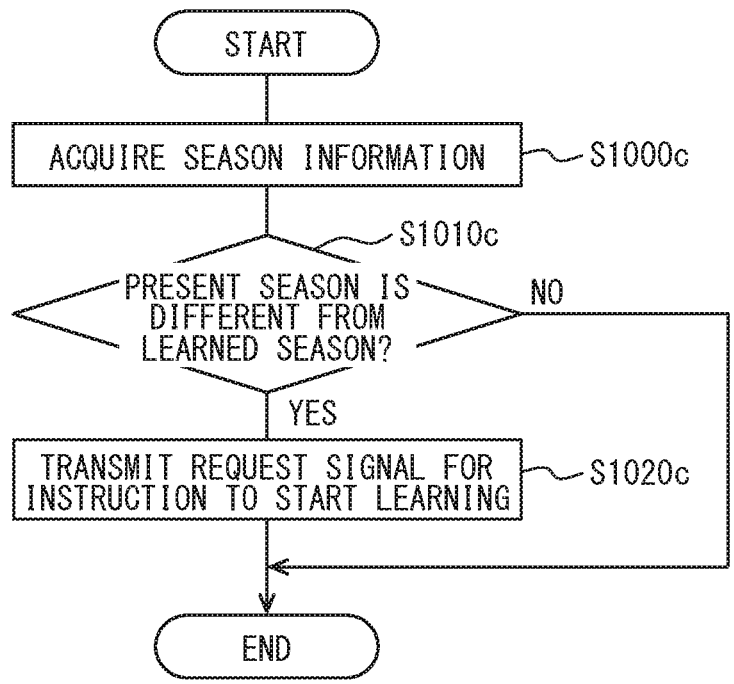
FIG. 19 is a flow chart illustrating a specific example of the environment determination process to be performed by the vehicle-body-side system.

In FIG. 19, in S1000c, a process of acquiring season information is performed. The environment determination unit 21d or the like also performs this process by acquiring current season information or acquiring current date information using, e.g., the navigation system as the peripheral device 22. Then, the environment determination unit 21d or the like advances to S1010c and determines whether or not the current season most recently acquired is different from the learned season. Specifically, when an environment is such that the current season is winter, while the situation in which the support vector was learned was in, e.g., spring, the environment determination unit 21d or the like determines that there is the "situation in which the support vector is to be learned". When making an affirmative determination, the environment determination unit 21d or the like advances to S1020c, performs the same process as performed in S1020a described above, and ends the process.

Figure 20:
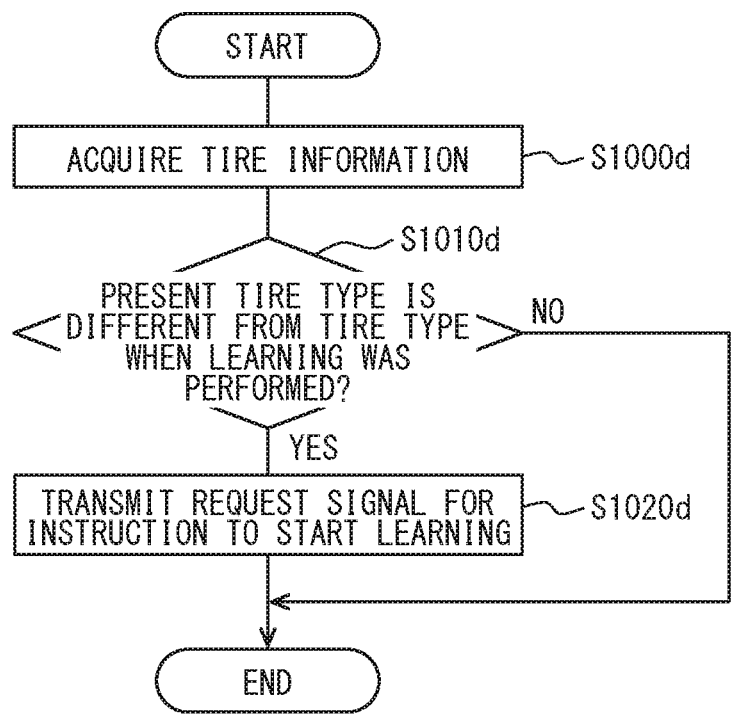
FIG. 20 is a flow chart illustrating a specific example of the environment determination process to be performed by the vehicle-body-side system.

In FIG. 20, in S1000d, a process of acquiring tire information is performed. The environment determination unit 21d or the like performs this process by reading, using the receiver 21 as the peripheral device 22, information recorded in the receiver 21 when, e.g., the type of the tire 3 was changed. Then, the environment determination unit 21d or the like advances to S1010d and determines whether or not the type of the tire 3 indicated by the tire information acquired most recently is different from that when learning was performed, e.g., whether or not there is a change from a genuine tire. Specifically, when the type of the tire 3 was, e.g., the genuine tire in a situation in which the support vector was learned and when the current type of the tire 3 is not the genuine tire, the environment determination unit 21d or the like determines that there is the "situation in which the support vector is to be learned". When making an affirmative determination, the environment determination unit 21d or the like advances to S1020d, performs the same process as performed in S1020a described above, and ends the process. Note that, while the change from the genuine tire is described herein by way of example, when the learning after the change is completed, the resulting tire information can also be newly added as learned tire information. In that case, in the process in S1010d, it is appropriate to cause the type of the tire 3 when learning was performed to include the newly learned tire information in addition to the genuine tire.

Figure 21:
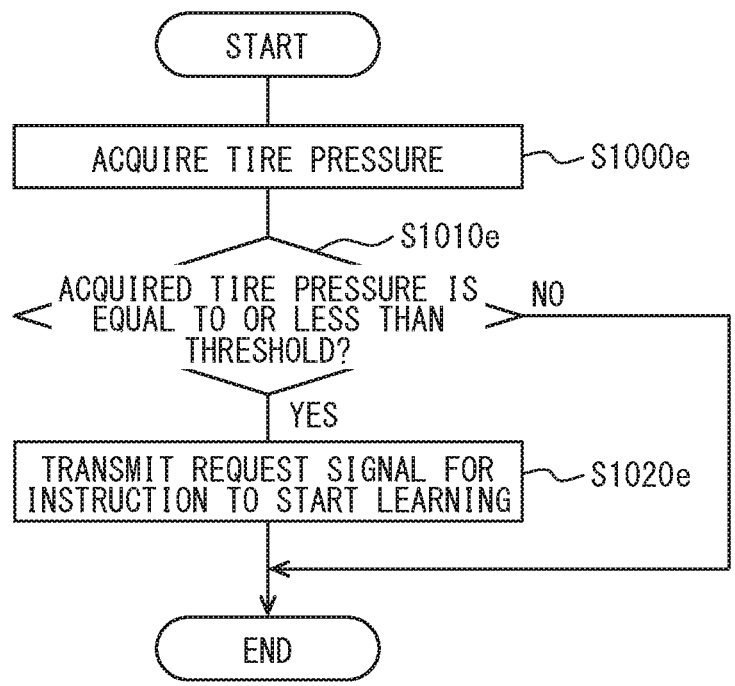
FIG. 21 is a flow chart illustrating a specific example of the environment determination process to be performed by the vehicle-body-side system.

In FIG. 21, in S1000e, a process of acquiring the tire pressure is performed. The environment determination unit 21d or the like performs this process by acquiring information on the tire pressure as the tire information using, for example, the TPMS as the peripheral device 22. Then, the environment determination unit 21d or the like advances to S1010e and determines whether or not the tire pressure acquired most recently is a predetermined threshold or less. Specifically, while the tire had an appropriate tire pressure in a situation in which the support vector was learned, when the current tire pressure has lowered to a level of the predetermined threshold or less, the environment determination unit 21d or the like determines that there is the "situation in which the support vector is to be learned". When making an affirmative determination, the environment determination unit 21d or the like advances to S1020e, performs the same process as performed in S1020a described above, and ends the process.

Figure 22:
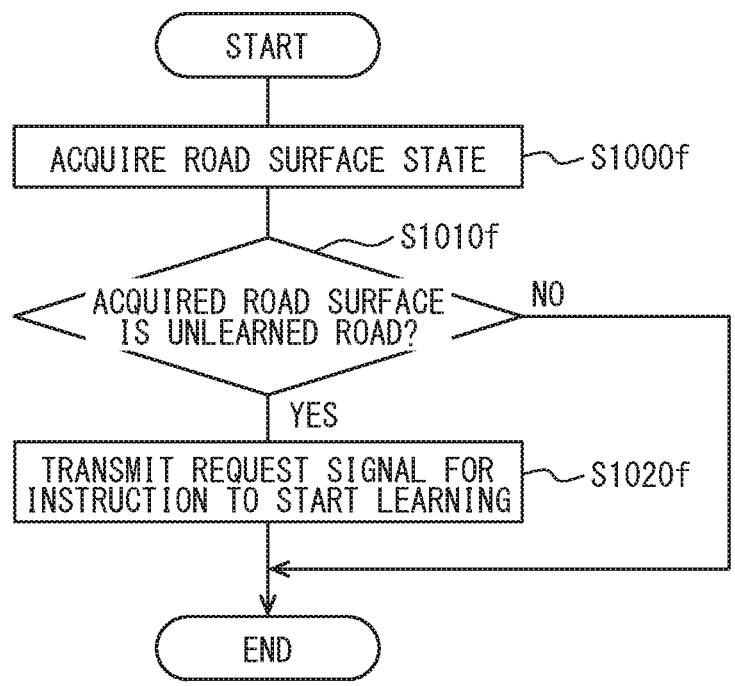
FIG. 22 is a flow chart illustrating a specific example of the environment determination process to be performed by the vehicle-body-side system.

In FIG. 22, in S1000f, a process of acquiring the road surface state is performed. The environment determination unit 21d or the like performs this process by using such as the in-vehicle camera or the brake ECU 23 as the peripheral device 22. When the in-vehicle camera is used, the environment determination unit 21d or the like performs the process by acquiring a result of estimation of the road surface state based on analysis of image data acquired by the in-vehicle camera. When the brake ECU 23 is used, the environment determination unit 21d or the like performs the process by acquiring a result of estimation of the road surface state performed by the brake ECU 23. Then, the environment determination unit 21d or the like advances S1010f and determines whether or not the road surface state acquired most recently is a road surface which has not been learned. Specifically, in the situation in which the support vector was learned, the road surface state was a road surface set for learning such as, e.g., a dry road surface such as an asphalt-paved road surface, a wet road surface, a frozen road, or a snow-covered road. Therefore, it is determined that a rocky road or the like corresponds to the "situation in which the support vector is to be learned". When making an affirmative determination herein, the environment determination unit 21d or the like advances to S1020f, performs the same process as performed in S1020a described above, and ends the process.

Figure 23:
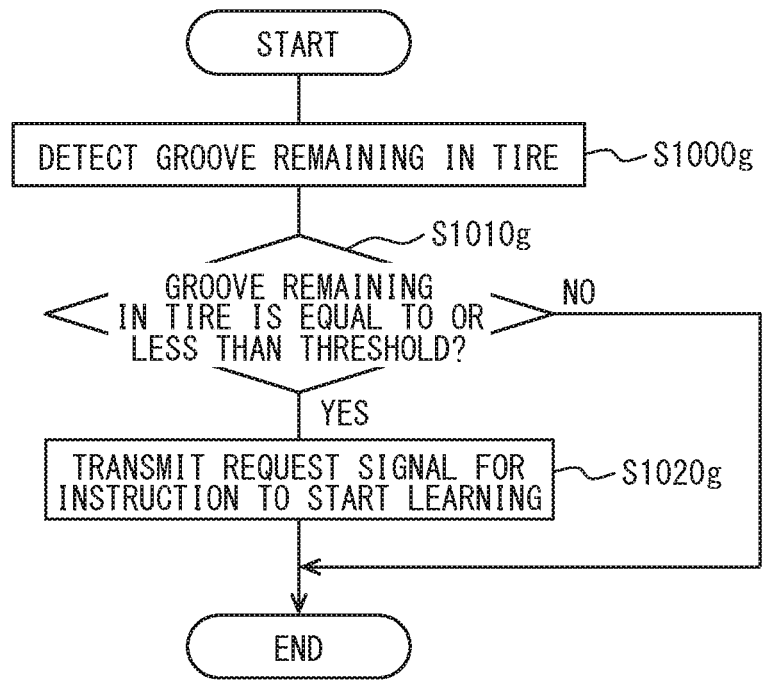
FIG. 23 is a flow chart illustrating a specific example of the environment determination process to be performed by the vehicle-body-side system.

In FIG. 23, in S1000g, a detection process for a groove remaining in the tire 3 is performed, that is, a tire worn state is detected. In this process, the environment determination unit 21d or the like registers the execution of tire replacement in the receiver 21 using, e.g., the receiver 21 or the meter ECU as the peripheral device 22. The environment determination unit 21d or the like acquires, from the meter ECU, the running distance from the time of the register, and calculates the groove remaining the tire 3 from the running distance. Then, the environment determination unit 21d or the like advances to S1010g and determines whether or not the groove remaining in the tire 3 acquired most recently is equal to or less than a threshold. Specifically, since the tire 3 had the sufficient groove in the situation in which the support vector was learned, when the remaining groove is equal to or less than the threshold, the environment determination unit 21d or the like determines that there is the "situation in which the support vector is to be learned". When making an affirmative determination, the environment determination unit 21d or the like advances to S1020g, performs the same process as performed in S1020a described above, and ends the process.

Figure 24:
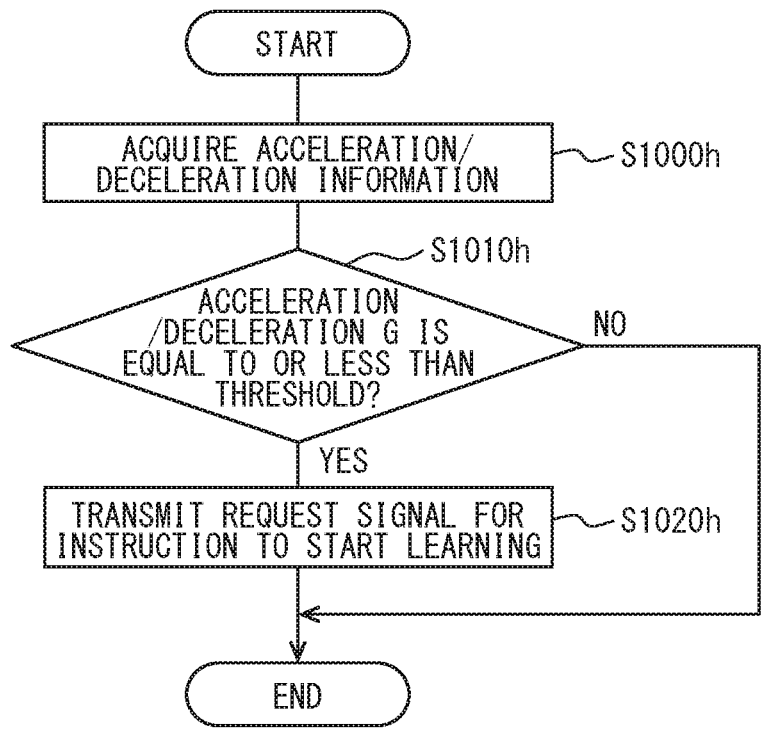
FIG. 24 is a flow chart illustrating a specific example of the environment determination process to be performed by the vehicle-body-side system.

In FIG. 24, in S1000h, a process of acquiring acceleration/deceleration information is performed. The environment determination unit 21d or the like performs this process by using the brake ECU 23 or the meter ECU as the peripheral device 22 and calculating an acceleration/deceleration from a vehicle speed processed by, e.g., the brake ECU 23 or the meter ECU. Then, the environment determination unit 21d or the like advances to S1010h and determines whether or not the acceleration/deceleration acquired most recently is outside a predetermined threshold range. Specifically, since the acceleration/deceleration was within the predetermined threshold range in the situation in which the support vector was learned, when the acceleration/deceleration is outside the threshold range, the environment determination unit 21d or the like determines that there is the "situation in which the support vector is to be learned". When making an affirmative determination herein, the environment determination unit 21d or the like advances to S1020h, performs the same process as performed in S1020a described above, and ends the process.

The environment determination process is performed as described above. When the request signal for the instruction to start learning is output in each of S1020a to S1020h, the tire-side device 1, the vehicle-body-side system 2, and the communication center 200 perform each of processes based on the request signal.

Figure 25:
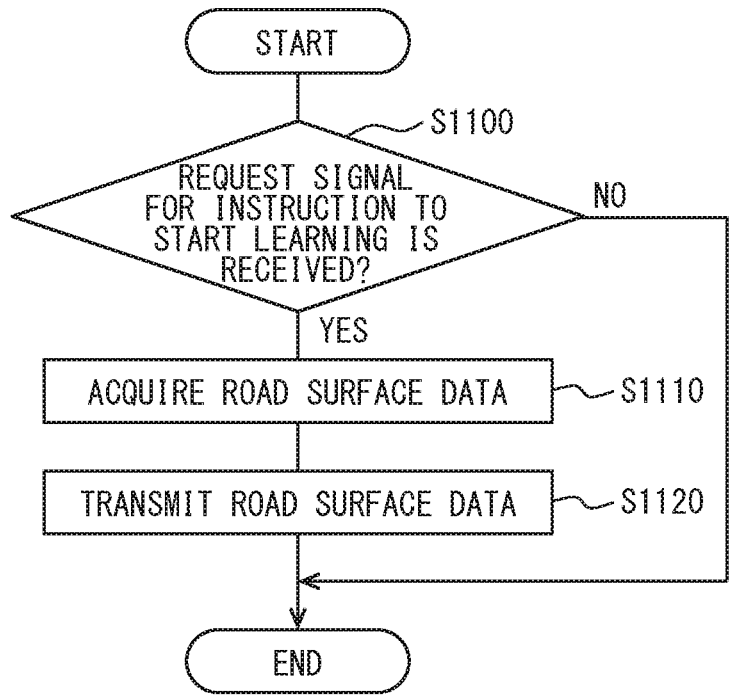
FIG. 25 is a flow chart illustrating a data transmission process performed by the tire-side device.

First, the tire-side device 1 performs a data transmission process illustrated in FIG. 25. As illustrated in FIG. 25, in S1100, the tire-side device 1 determines whether or not there is the request signal for the instruction to start learning. As described above, when the vehicle-body-side system 2 outputs the request signal for the instruction to start learning, the tire-side device 1 makes an affirmative determination in S1100 and advances to S1110. Then, after acquiring the road surface data including the raw waveform data item corresponding to one tire rotation, the tire-side device 1 advances to S1120 and performs data transmission of the road surface data to the vehicle-body-side system 2. Note that the process in S1110 can be performed using the same method as used in each of the processes in FIG. 6 described above.

Figure 26:
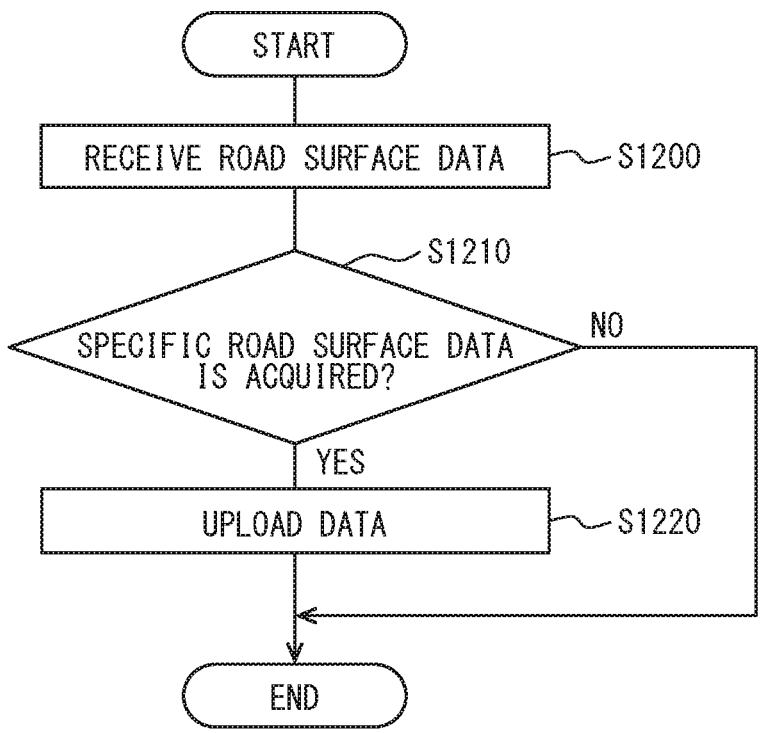
FIG. 26 is a flow chart illustrating a learning data transmission process performed by the vehicle-body-side system.

Then, when the tire-side device 1 transmits the road surface data, the vehicle-body-side system 2 performs a learning data transmission process illustrated in FIG. 26. First, in S1200, the vehicle-body-side system 2 performs a process of receiving the road surface data including the raw waveform data item and transmitted from the tire-side device 1, and then determines whether or not the road surface data is acquired in S1210. When the road surface data is not received successfully in S1200, the vehicle-body-side system 2 ends the process. Meanwhile, when the road surface data is received successfully, the vehicle-body-side system 2 advances to S1220 and performs a process of transmitting the received road surface data as the learning data to the communication center 200 so as to upload the road surface data to the communication center 200.

Figure 27:
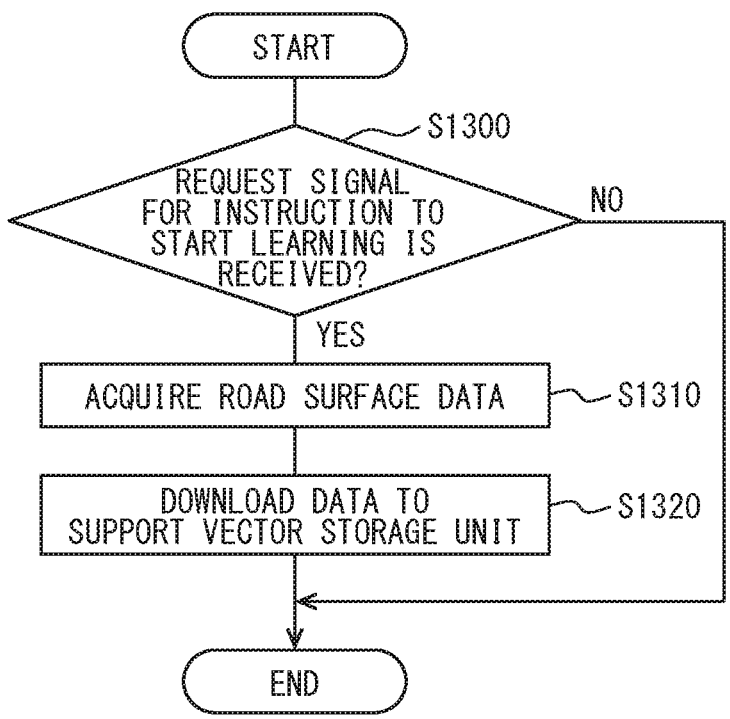
FIG. 27 is a flow chart illustrating a learning process performed by the communication center.

The communication center 200 further performs a learning process illustrated in FIG. 27. First, in S1300, the communication center 200 determines whether or not there is the request signal for the instruction to start learning. As described above, when the request signal for the instruction to start learning is output from the vehicle-body-side system 2, the communication center 200 makes an affirmative determination in S1300 and advances to S1310. Then, the communication center 200 determines whether or not the road surface data including the raw waveform data item and transmitted from the vehicle-body-side system 2 is acquired. When the road surface data is acquired, the communication center 200 advances to S1320 and starts learning. When ending the learning, the communication center 200 transmits a result of the learning to the vehicle-body-side system 2 and downloads the learning result to the support vector storage unit 21b. A processing method used at this time by the communication center 200 is similar to that used in S510 to S530 in FIG. 10, and a method used by the vehicle-body-side system 2 to download data to the support vector storage unit 21b based on the processing method is also similar to that used in S600 to S620 in FIG. 11.

As described above, it is possible to determine whether or not there are various "situations in which the support vectors are to be learned" and newly add and update the learning data even for a situation other than a learned situation. This configuration allows learning data for more various situations to be obtained and allows the road surface state to be more reliably determined.

Fifth Embodiment

A description will be given of a fifth embodiment. In the fifth embodiment, in contrast to the first to fourth embodiments, the tire-side device 1 detects a change in the road surface state. When there is a change in the road surface state, the tire-side device 1 transmits the road surface change to the vehicle-body-side system 2 to cause learning to be started. The fifth embodiment is otherwise similar to the first to fourth embodiments, and accordingly a description will be given only of portions different from those in the first to fourth embodiments.

Figure 28:
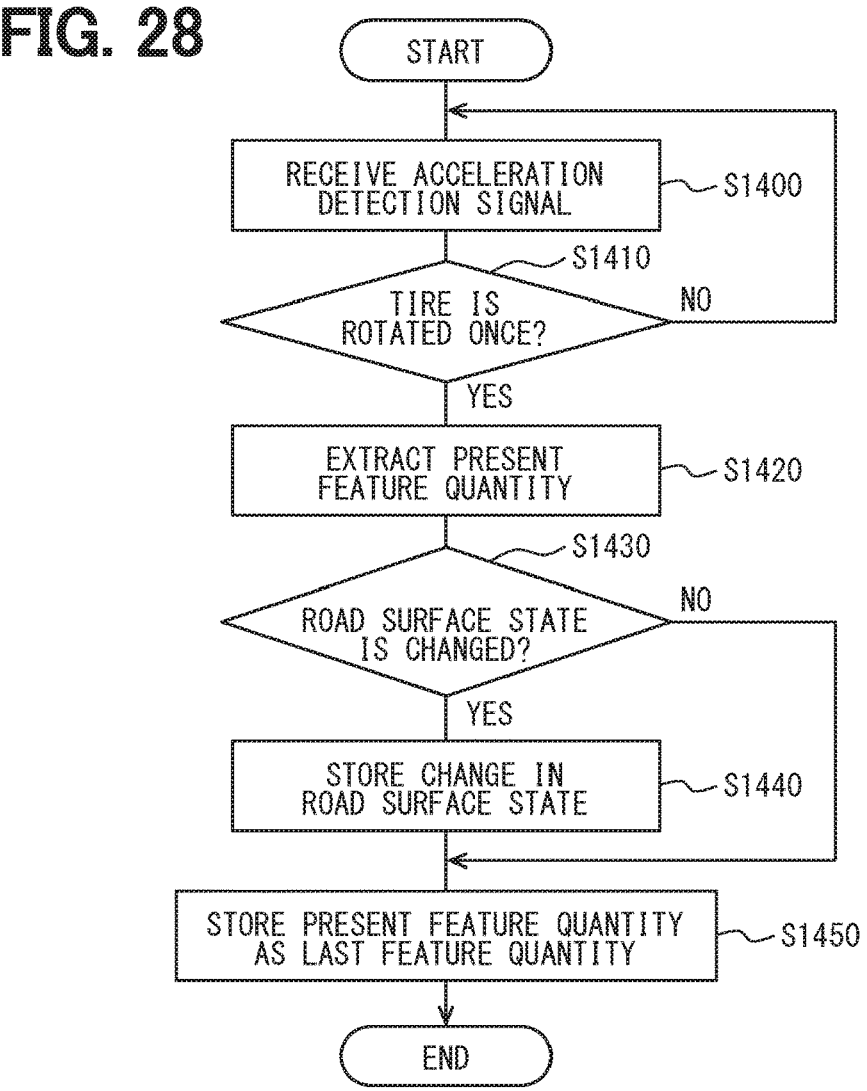
FIG. 28 is a flow chart illustrating a road surface change detection process performed by the tire-side device.

In the fifth embodiment, the tire-side device 1 detects a change in the road surface state based on a detection signal from the vibration sensor unit 1a and transmits the change to the vehicle-body-side system 2. Specifically, the tire-side device 1 performs a road surface change detection process illustrated in FIG. 28.

First, in S1400, the tire-side device 1 performs a process of receiving the detection signal from the vibration sensor unit 1a, which is continued in S1410 for a period before the tire 3 rotates once. Then, when receiving the detection signal corresponding to one tire rotation from the vibration sensor unit 1a, the tire-side device 1 advances to S1420. In S1420, the tire-side device 1 extracts, as the most recent feature quantity, the feature quantity of the time axis waveform of the detection signal corresponding to one tire rotation that has been received from the acceleration acquisition unit 10. A method of extracting the feature quantity at this time is similar to that used in S120 in FIG. 6.

Then, the tire-side device 1 advances to S1430 and determines the degree of similarity of the most recent feature quantity to the immediately previous feature quantity in accordance with the method described with respect to S220 in FIG. 7 and compares the degree of similarity to, e.g., a threshold Th to determine whether or not there is a change in the road surface state. Then, when making an affirmative determination in S1430, the tire-side device 1 stores the occurrence of a change in the road surface state in S1440. The tire-side device 1 further advances to S1450, stores the most recent feature quantity as the immediately previous feature quantity in the feature quantity storage unit 11b, and ends the process.

Figure 29:
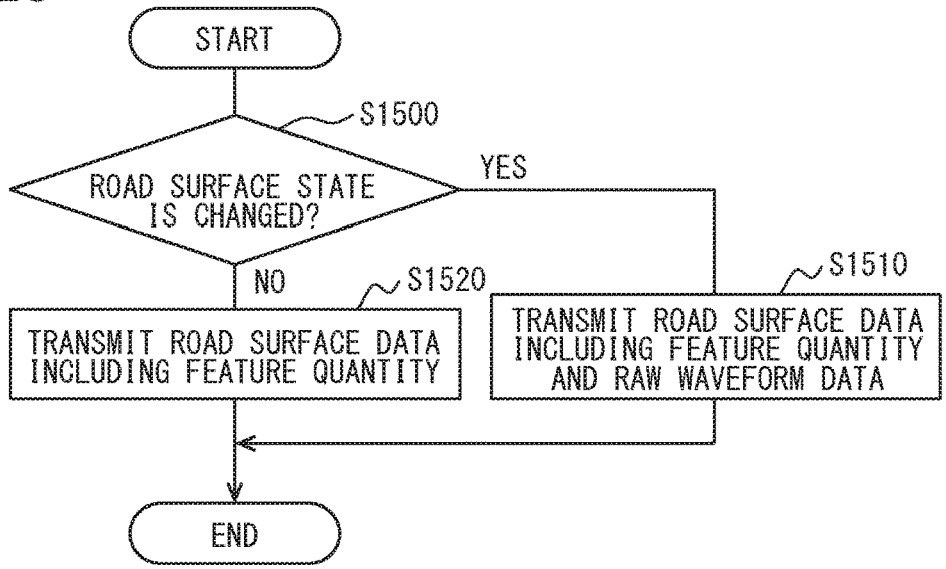
FIG. 29 is a flow chart illustrating a data transmission process performed by the tire-side device.

The tire-side device 1 also performs a data transmission process illustrated in FIG. 29. First, in S1500, the tire-side device 1 determines whether or not it is determined that there is a change in the road surface state. This determination is made based on whether or not the occurrence of a change in the road surface state is stored in S1440 in FIG. 27 described above. When making an affirmative determination in S1500, the tire-side device 1 advances to S1510 and transmits, together with the road surface data including the most recent feature quantity and the raw waveform data item, data representing the occurrence of a change in the road surface state to the vehicle-body-side system 2. When making a negative determination in S1500, the tire-side device 1 advances to S1520 and transmits the road surface data including the most recent feature quantity.

Thereafter, the individual processes illustrated in FIGS. 7 to 11 described in the first embodiment are performed. The individual processes are substantially similar to those in the first embodiment. However, the transmission of the data representing the occurrence of a change in the road surface state from the tire-side device 1 in S320 of FIG. 8 is also determined to correspond to the "situation in which the support vector is to be learned".

Thus, it is also possible to cause the tire-side device 1 to detect a change in the road surface state and transmit the road surface state change as the "situation in which the support vector is to be learned" to the vehicle-body-side system 2, and cause the communication center 200 to perform learning of the support vector.

Other Embodiments

While the present disclosure has been described in accordance with the embodiments described above, the present disclosure is not limited to the embodiments and encompasses various modifications and variations in the equivalent range. In addition, various combinations and modes, and further, other combinations and modes including only one element thereof, less or more, are intended to fall within the scope and spirit of the present disclosure.

(1) For example, in each of the embodiments described above, the case where the vibration sensor unit 1a constituting the vibration detection unit is provided by the acceleration sensor is shown by way of example. Alternatively, the vibration sensor unit 1a may also be provided by another element capable of detecting vibration such as, e.g., a piezoelectric element.

(2) Also, in each of the embodiments described above, as the road surface data representing the road surface state shown in the detection signal from the vibration sensor unit 1a of the tire-side device 1, the data including the feature quantity is used. However, this is an exemplary, and another data may also be used as the road surface data. For example, integral value data of individual vibration waveforms in the five regions R1 to R5 included in the vibration data during one rotation of the tire 3 may also be used as the road surface data or, alternatively, raw data represented by the detection signal may also be used as the road surface data.

Likewise, the road surface data including the feature quantity and the raw waveform data item is transmitted to the communication center 200, but the road surface data may also include either one of the feature quantity and the raw waveform data item. Alternatively, it may also be possible to transmit, as the road surface data, the integral value data of the individual vibration waveforms in the five regions R1 to R5 included in the vibration data during one rotation of the tire 3 to the communication center 200.

(3) Also, in each of the embodiments described above, the road surface determination unit 21c of the receiver 21 included in the vehicle-body-side system 2 determines the degree of similarity of the feature quantity to the support vector and determines the road surface state.

However, this is an exemplary, and it may also be possible that any place in the vehicle-body-side system 2, e.g., another ECU such as the brake ECU 23 determines the degree of similarity, determines the road surface state, and transmits the instruction signal.

(4) Also, in each of the embodiments described above, the communication center 200 is used for the learning operation of learning the support vector. The reason for this configuration is an enormous amount data for the learning operation. However, it may also be possible to provide, e.g., the receiver 21 with a function of performing the learning operation of learning the support vector and allow the learning operation to be performed in each of the vehicles.

However, in the communication center 200, it is also possible to perform the learning operation of learning the support vector in additional consideration of various information not obtainable by each of the vehicles, e.g., the road surface state determined based on data from another vehicle or the like. Accordingly, by using the communication center 200, it is possible to more accurately perform the learning operation of learning the support vector to be used for update.

Also, in each of the embodiments described above, the configuration which performs the bidirectional communication between the tire-side device 1 and the receiver 21 is used. However, the configuration which performs the bidirectional communication need not necessarily be used. For example, in a case where the receiver 21 includes the support vector storage unit 21b, when the support vector is to be updated based on the environment data from the peripheral device 22, the learning operation of learning the support vector is performed based on the road surface data from the tire-side device 1. The learning operation of learning the support vector may also be performed by the communication center 200, the receiver 21 provided with the function of performing the learning operation, or the like. Thus, even when unidirectional communication which allows the data communication from the tire-side device 1 to the receiver 21 is performed, it is possible to perform the learning operation of learning the support vector and update the support vector.

(5) As an example of machine learning, the learning operation of learning the support vector is described, and the support vector is described as an example of the learning data. However, the present disclosure is also applicable to an example in which the learning data is updated by another well-known machine learning.

Also, in each of the embodiments described above, the tire-side device 1 is provided in each of the plurality of tires 3. However, it is sufficient that the tire-side device 1 is provided in at least one of the plurality of tires 3.

What is claimed is:

1. A road surface state determination device comprising:
a tire-side device attached to a tire of a vehicle; and
a vehicle-body-side system included in a vehicle body, wherein:
the tire-side device includes
a sensor configured to output a detection signal corresponding to a magnitude of vibration of the tire,
a first processor configured to generate road surface data indicative of a road surface state shown in a waveform of the detection signal, and
a first transceiver configured to transmit the road surface data;
the vehicle-body-side system includes
a second transceiver configured to receive the road surface data transmitted from the first transceiver,
a storage configured to store learning data,
a second processor configured to determine the road surface state of a road surface on which the vehicle is traveling based on the road surface data and the learning data,
a peripheral device configured to acquire environment data related to the road surface state, and
a third processor configured to determine, based on the environment data, whether the vehicle is in a learning situation, which is a situation in which a learning operation for the learning data is to be performed, and cause the second transceiver to transmit a request signal to the tire-side device when determining that the vehicle is in the learning situation;
when the first transceiver receives the request signal, the first processor generates the road surface data and causes the first transceiver to transmit the road surface data to the vehicle-body-side system; and
when the learning operation, by machine learning, is performed to generate update data for updating the learning data using the road surface data transmitted from the tire-side device and a type of the learning situation, which is indicated by the environment data, the vehicle-body-side system causes the storage to store new learning data by adding the update data to the learning data stored in the storage.

2. The road surface state determination device according to claim 1, wherein
when the first transceiver receives the request signal, the tire-side device generates, as the road surface data, data including at least one of a feature quantity indicative of a feature of the vibration of the tire and a raw waveform data item of the detection signal, and causes the first transceiver to transmit the road surface data to the vehicle-body-side system.

3. The road surface state determination device according to claim 1, wherein
when the second transceiver receives the road surface data, the vehicle-body-side system performs the machine learning to generate the update data based on the road surface data.

4. The road surface state determination device according to claim 1, wherein
the third processor determines, based on the environment data, whether a present situation is different from the situation in which the learning data was learned; and
the third processor determines that the present situation is in the learning situation when determining that the present situation is different from the situation in which the learning data was learned.

5. The road surface state determination device according to claim 4, wherein
the third processor determines whether the present situation is different from the situation in which the learning data was learned based on, as the environment data, at least one of an environment in which the vehicle is traveling, a manner in which the vehicle is traveling, a tire information item, a weather information item, a temperature information item, a season information item, a region information item, and a frozen road surface information item.

6. A road surface state determination device comprising:
a tire-side device attached to a tire of a vehicle; and
a vehicle-body-side system included in a vehicle body, wherein:
the tire-side device includes
a sensor configured to output a detection signal corresponding to a magnitude of vibration of the tire,
a storage configured to store learning data,
a first processor configured to determine a road surface state of a road surface on which the vehicle is traveling based on the detection signal and the learning data, generate data indicative of determination result, and generate road surface data indicative of the road surface state shown in a waveform of the detection signal, and
a first transceiver configured to transmit the data indicative of determination result and the road surface data;
the vehicle-body-side system includes
a second transceiver configured to receive the data indicative of determination result and the road surface data transmitted from the first transceiver,
a second processor configured to determine the road surface state based on the data indicative of determination result,
a peripheral device configured to acquire environment data related to the road surface state, and
a third processor configured to determine, based on the environment data, whether the vehicle is in a learning situation, which is a situation in which a learning operation for the learning data is to be performed, and cause the second transceiver to transmit a request signal to the tire-side device when determining that the vehicle is in the learning situation;
when the first transceiver receives the request signal, the first processor generates, as the road surface data, data including at least one of a feature quantity indicative of a feature of the vibration of the tire and a raw waveform data item of the detection signal, and causes the first transceiver to transmit the road surface data to the vehicle-body-side system;
when the learning operation, by machine learning, is performed to generate update data for updating the learning data using the road surface data transmitted from the tire-side device and a type of the learning situation, which is indicated by the environment data, the vehicle-body-side system transmits the update data to the tire-side device; and
the storage stores new learning data by adding the update data to the learning data stored in the storage.

7. A road surface state determination device comprising:
a tire-side device attached to a tire of a vehicle; and
a vehicle-body-side system included in a vehicle body, wherein:
the tire-side device includes
a sensor configured to output a detection signal corresponding to a magnitude of vibration of the tire, a first processor configured to generate road surface data indicative of a road surface state shown in a waveform of the detection signal, and a first transceiver configured to transmit the road surface data;

the vehicle-body-side system includes a second transceiver configured to receive the road surface data transmitted from the first transceiver, a storage configured to store learning data, and a second processor configured to determine the road surface state of a road surface on which the vehicle is traveling based on the road surface data and the learning data;

when the tire-side device determines that a change in the road surface state occurs based on the detection signal, the first transceiver transmits data indicative of the change in the road surface state together with the road surface data;

when the vehicle-body-side system receives the data indicative of the change in the road surface state, the vehicle-body-side system determines that the vehicle is in a learning situation, which is a situation in which a learning operation for the learning data is to be performed; and when the learning operation, by machine learning, is performed to generate update data for updating the learning data using the road surface data and a type of the learning situation, which is indicated by the change in the road surface state, the vehicle-body-side system causes the storage to store new learning data by adding the update data to the learning data in the storage.

8. The road surface state determination device according to claim 7, wherein:

the first processor extracts a feature quantity of the detection signal during one rotation of the tire, and generates the road surface data including the feature quantity; and the first processor determines whether the change in the road surface state occurs based on a most recent feature quantity that is the feature quantity extracted during a most recent rotation of the tire and a previous feature quantity that is the feature quantity extracted during a previous rotation of the tire.

9. The road surface state determination device according to claim 7, wherein:

the vehicle-body-side system further includes a third processor configured to determine whether the vehicle is in the learning situation, and cause the second transceiver to transmit a request signal to the tire-side device when determining that the vehicle is in the learning situation;

when the first transceiver receives the request signal, the first processor generates the road surface data and causes the first transceiver to transmit the road surface data to the vehicle-body-side system; and when the learning operation, by the machine learning, is performed to generate the update data for updating the learning data using the road surface data transmitted from the tire-side device and the type of the learning situation, which is indicated by the environment data, the vehicle-body-side system causes the storage to store the new learning data by adding the update data to the learning data.

10. A tire system comprising:

the road surface state determination device according to claim 1; and a communication center configured to perform data communication with the vehicle-body-side system, wherein:

the vehicle-body-side system further includes an external communication device configured to perform the communication with the communication center;

the vehicle-body-side system causes the external communication device to transmit, to the communication center, the road surface data received from the tire-side device; and when the communication center receives the road surface data from the external communication device, the communication center performs the machine learning to generate the update data based on the road surface data and transmits the update data to the external communication device.

11. The tire system according to claim 10, wherein:

the vehicle-body-side system or the tire-side device determines whether the road surface data matches with the learning data stored in the storage; and when the vehicle-body-side system or the tire-side device determines that the road surface data does not match with the learning data, the vehicle-body-side system requests learning data accumulated in the communication center by transmitting vehicle data related to the vehicle to the communication center.

* * * * *